US012785981B2

(12) United States Patent
Tweel et al.

(10) Patent No.: US 12,785,981 B2
(45) Date of Patent: Nov. 3, 2026

(54) AUTHENTICATION OF VIDEOS USING BLOCKCHAIN

(71) Applicant: Bank of America Corporation, Charlotte, NC (US)

(72) Inventors: Benjamin F. Tweel, Romeoville, IL (US); Aaliyah Williams, Chicago, IL (US); Colin Maxwell Behr, Gilberts, IL (US); Allison Glenn, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 28 days.

(21) Appl. No.: 19/054,083

(22) Filed: Feb. 14, 2025

(65) Prior Publication Data

US 2026/0246646 A1 Aug. 20, 2026

(51) Int. Cl.

| | |
|---|---|
| ***H04L 29/06*** | (2006.01) |
| ***H04L 9/00*** | (2022.01) |
| ***H04L 9/08*** | (2006.01) |
| ***H04L 9/32*** | (2006.01) |

(52) U.S. Cl.

CPC .......... *H04L 9/3236* (2013.01); *H04L 9/0891* (2013.01); *H04L 9/0894* (2013.01); *H04L 9/3221* (2013.01); *H04L 9/50* (2022.05)

(58) Field of Classification Search

CPC ..... H04L 9/33236; H04L 9/50; H04L 9/0891; H04L 9/0894; H04L 9/3221

See application file for complete search history.

(56) References Cited

U.S. PATENT DOCUMENTS

| | | | | |
|---|---|---|---|---|
| 10,361,866 | B1 | 7/2019 | McGregor et al. | |
| 11,368,289 | B1 | 6/2022 | Kvochko | |
| 11,469,904 | B1 | 10/2022 | Kats et al. | |
| 11,736,763 | B2 | 8/2023 | Ye et al. | |
| 2014/0010366 | A1 | 1/2014 | Quinn et al. | |
| 2016/0283920 | A1* | 9/2016 | Fisher | H04L 9/3239 |
| 2018/0115416 | A1 | 4/2018 | Diehl | |
| 2021/0264444 | A1 | 8/2021 | Chen et al. | |
| 2022/0398296 | A1* | 12/2022 | Banh | H04L 9/0618 |

FOREIGN PATENT DOCUMENTS

| | | | |
|---|---|---|---|
| DE | 202025100776 U1 * | 2/2025 | H04L 63/0861 |

* cited by examiner

*Primary Examiner* — Evans Desrosiers
(74) *Attorney, Agent, or Firm* — Banner & Witcoff, Ltd.

(57) ABSTRACT

A blockchain-based video authentication system ensures the integrity, authenticity, and security of digital video content by integrating cryptographic hashing, dynamic watermarking, AI-driven anomaly detection, and decentralized ledger storage. A video file is processed to generate a cryptographic hash, which is immutably stored in a blockchain ledger. A rotating digital watermark is embedded in the video to detect tampering. AI models, including convolutional and recurrent neural networks, analyze frames and motion patterns for manipulation. A fraud detection module leverages generative adversarial networks to identify deepfake alterations. A predictive threat analysis engine employs machine learning to detect emerging manipulation techniques. Verification is enabled via an API, a zero-knowledge proof engine, a browser plugin, and a mobile application. An active watermarking module monitors playback, detecting unauthorized use. A consensus-based validation mechanism ensures tamper resistance. The system provides a scalable, real-time, and privacy-preserving solution for securing and verifying digital video content.

20 Claims, 7 Drawing Sheets

Sample System Architecture Diagram

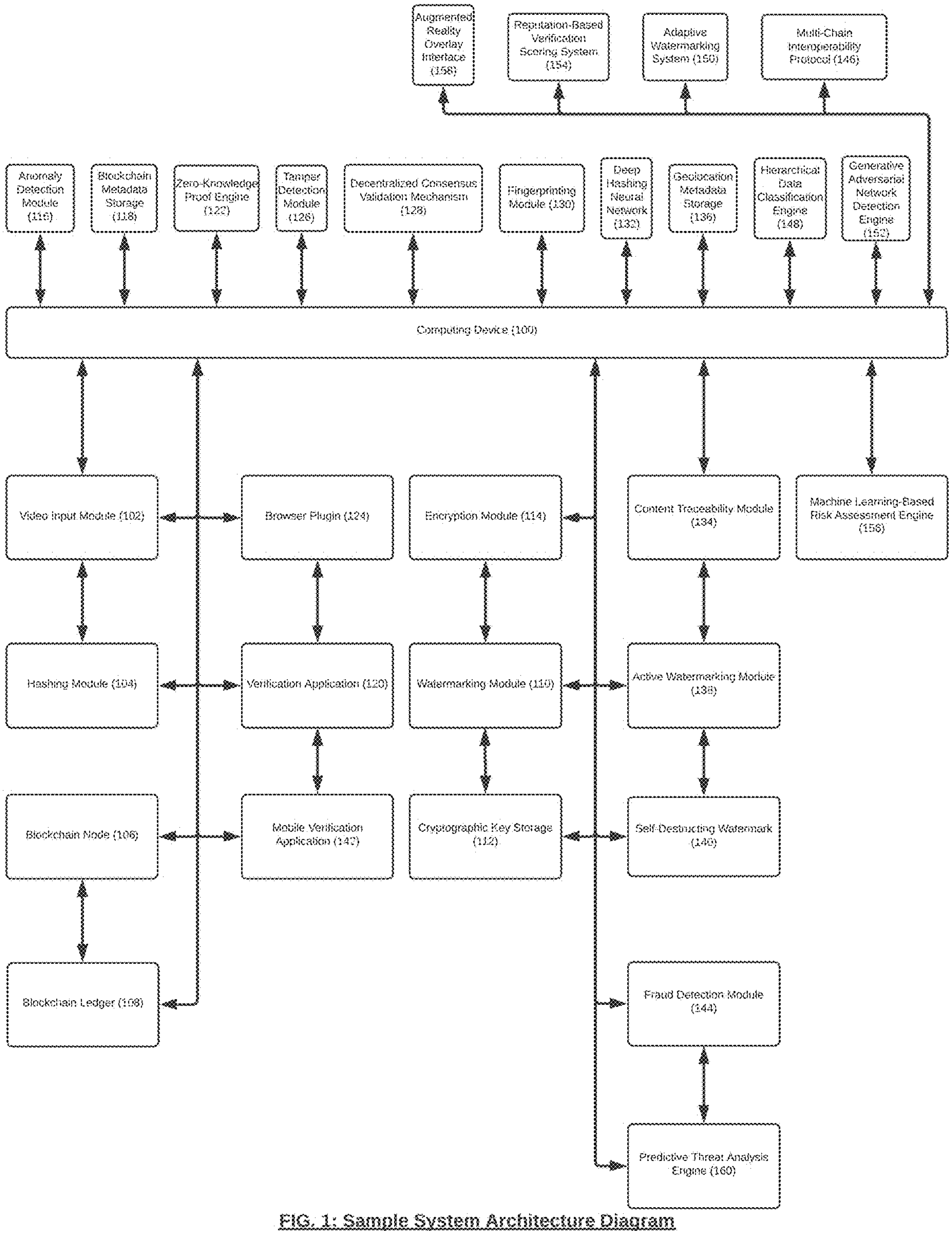
FIG. 1: Sample System Architecture Diagram

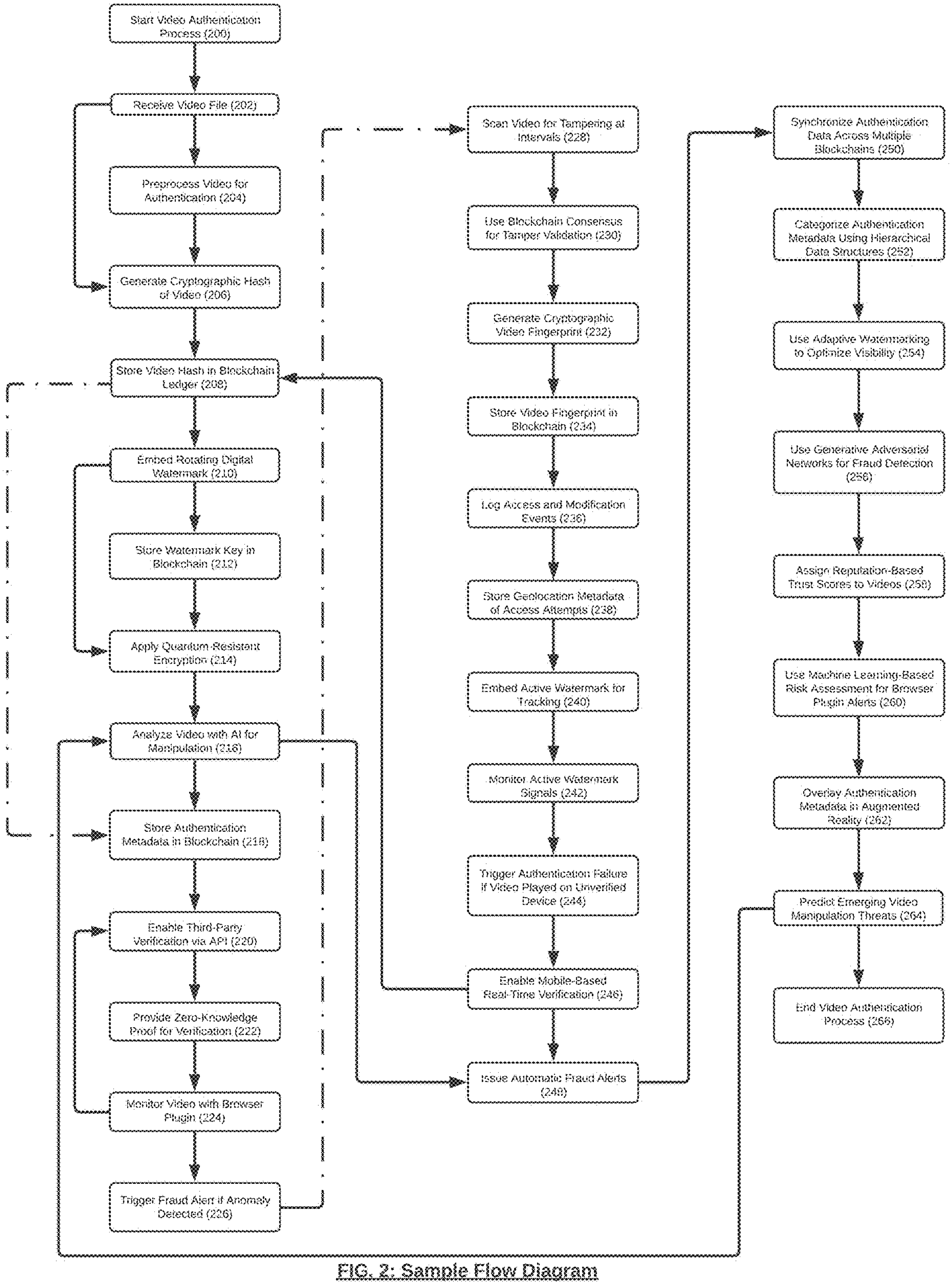
FIG. 2: Sample Flow Diagram

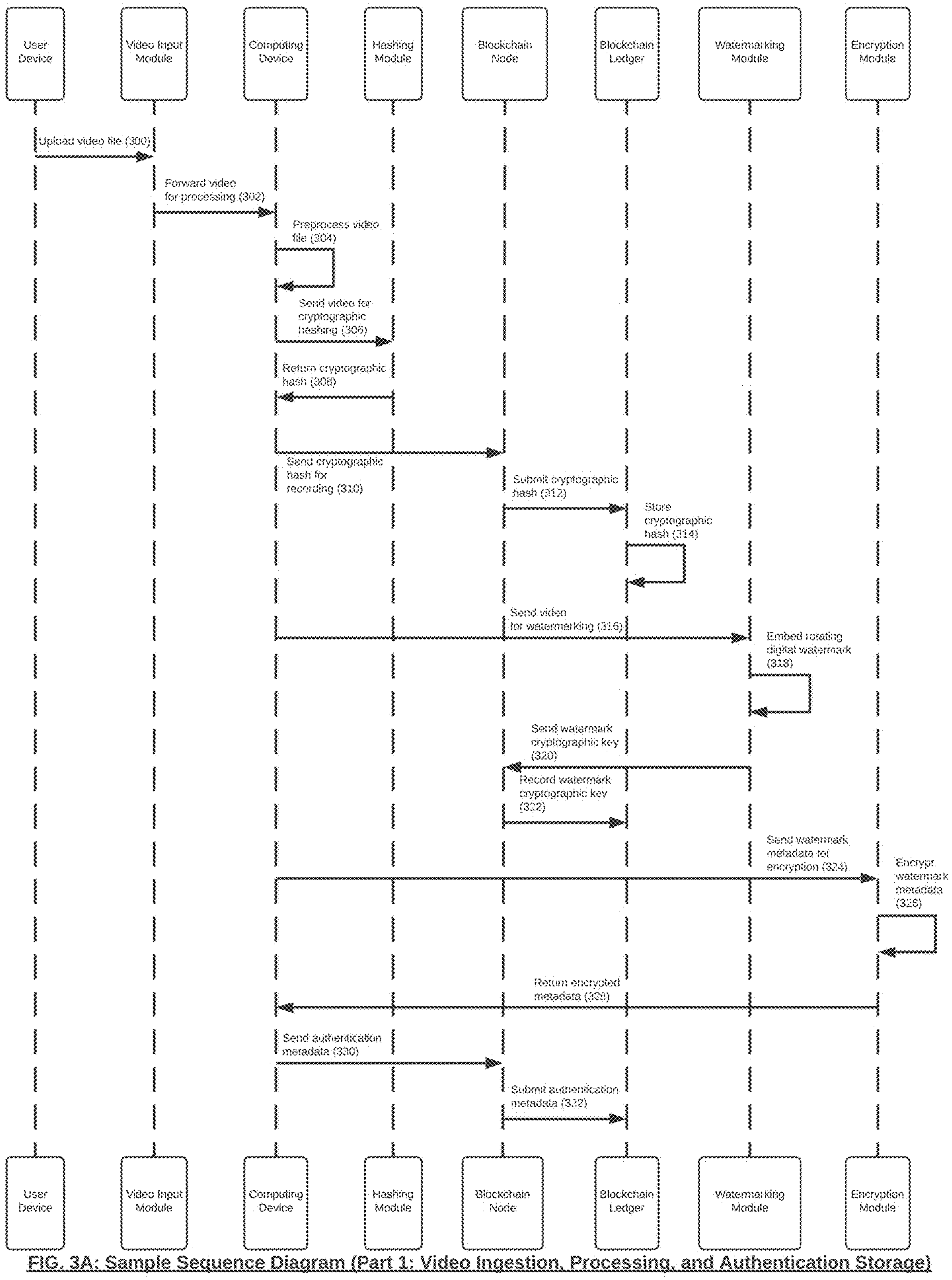
FIG. 3A: Sample Sequence Diagram (Part 1: Video Ingestion, Processing, and Authentication Storage)

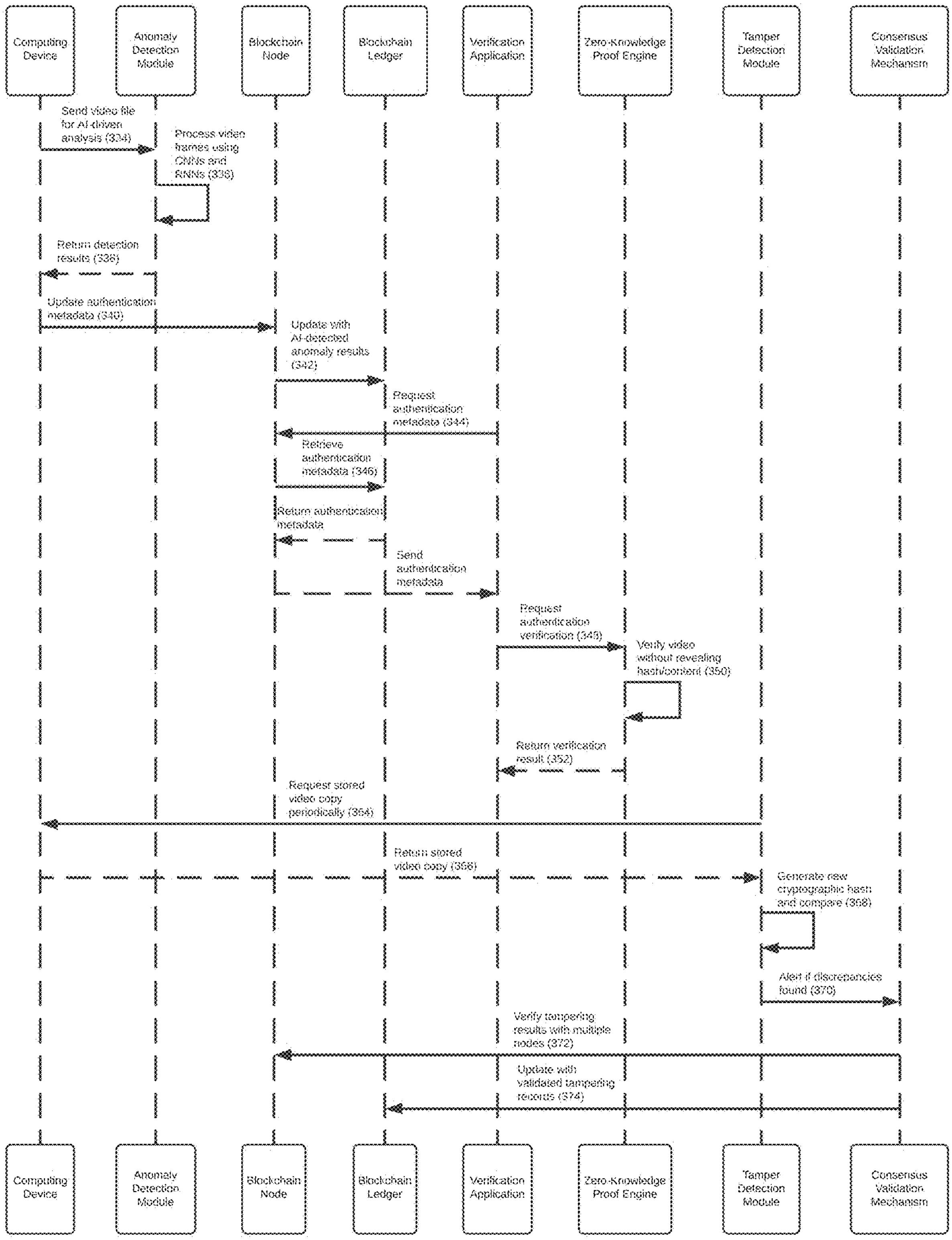
FIG. 3B: Sample Sequence Diagram (Part 2: Video Analysis, Verification, and Tamper Detection)

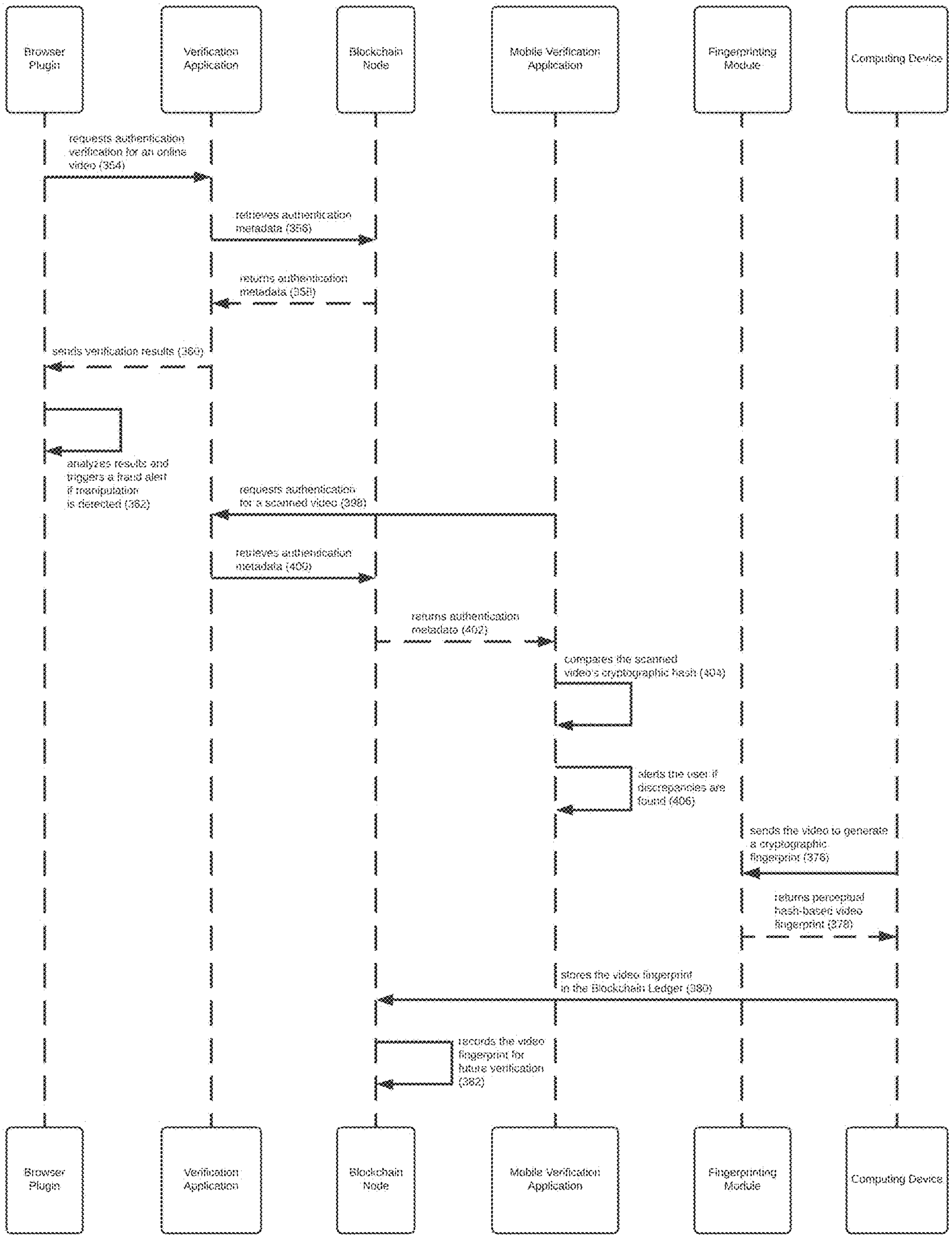
FIG. 3C Sample Sequence Diagram (Part 3: Real-Time Verification and Fingerprinting)

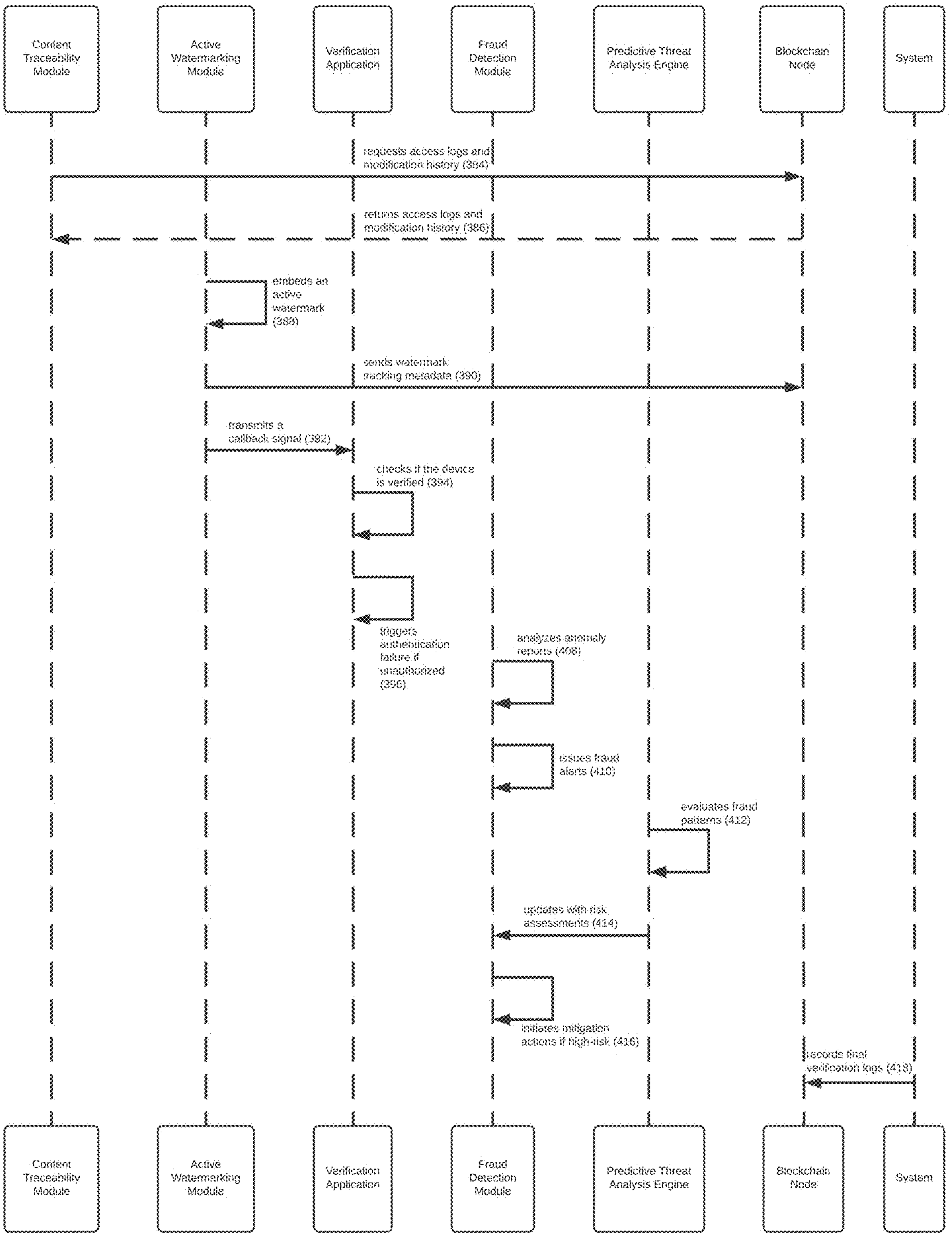
FIG. 3D Sample Sequence Diagram (Part 4: Content Traceability, Active Monitoring, and Fraud Detection)

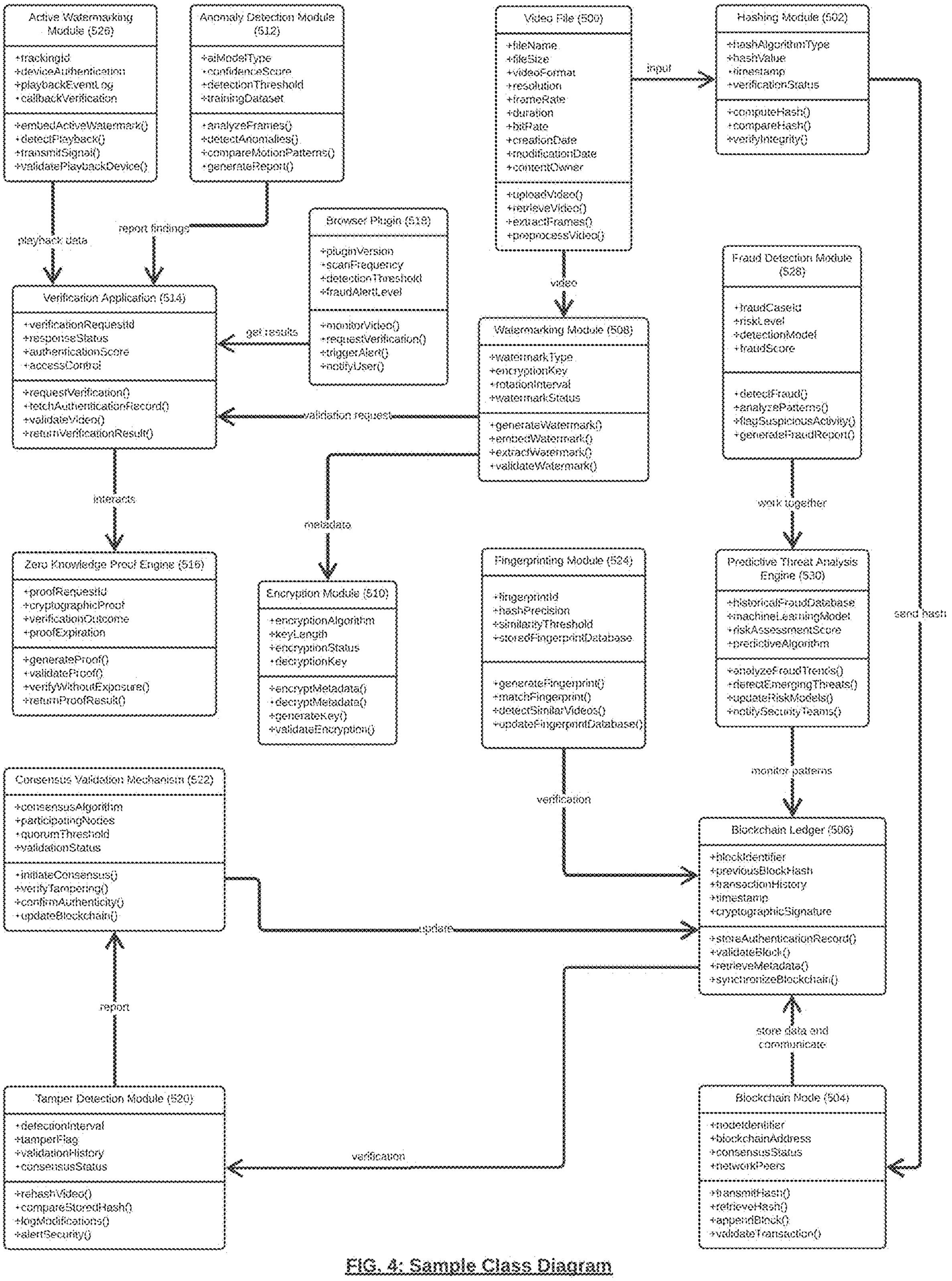
FIG. 4: Sample Class Diagram

AUTHENTICATION OF VIDEOS USING BLOCKCHAIN

TECHNICAL FIELD

The inventions disclosed herein pertain to the fields of cryptography, digital watermarking and steganography, secure communication systems, computer security and access control, artificial intelligence and machine learning, and multimedia processing and digital video technology. Cryptography ensures the security of video authentication through quantum-proof encryption, protecting validated content against unauthorized tampering and emerging computational threats. Digital watermarking and steganography enhance fraud prevention by embedding a rotating digital watermark within video content, dynamically altering over time to resist duplication and unauthorized reproduction. Secure communication systems benefit from the invention's blockchain-based infrastructure, which provides a tamper-resistant method for verifying and transmitting video authentication records across distributed networks. In the field of computer security and access control, the invention integrates AI-powered anomaly detection and tamper detection alerts to identify fraudulent video content while incorporating metadata-based validation for access control based on permissions, geographic restrictions, and time constraints. Artificial intelligence and machine learning further support fraud detection by enabling adaptive models that recognize deepfake manipulations and evolving digital threats. Multimedia processing and digital video technology are advanced through the implementation of a video fingerprinting system, which assigns unique cryptographic identifiers to each validated video, ensuring content traceability and authenticity across digital platforms. These innovations collectively enhance the security, integrity, and verification of digital video content.

DESCRIPTION OF THE RELATED ART

Financial institutions, businesses, and individuals increasingly rely on video content for communication, marketing, authentication, and customer engagement. However, the proliferation of sophisticated digital manipulation techniques has made it increasingly difficult to distinguish between genuine and fraudulent video content. Cybercriminals and malicious actors leverage deepfake technology, AI-generated forgeries, and advanced editing tools to create highly convincing fake videos that can be used for fraud, misinformation, identity theft, and reputational harm. These deceptive videos can be disseminated across social media, financial platforms, and communication networks, leading to significant financial losses and erosion of trust. A major issue arises in the context of financial services, where video interactions with clients are becoming commonplace. Relationship managers, investment advisors, and banking representatives often use video calls and recorded messages to communicate with clients, verify transactions, and provide high-value financial advice. When fraudulent actors create manipulated videos that convincingly impersonate legitimate financial professionals, unsuspecting customers can be misled into transferring funds, disclosing sensitive information, or making financial decisions based on fabricated content. This creates a growing security risk that existing verification mechanisms struggle to mitigate.

Current methods for ensuring video authenticity are inadequate in addressing the evolving threats posed by deepfake technology. Traditional digital watermarking solutions rely on static identifiers that can be easily removed, manipulated, or cloned. While some authentication systems use centralized validation methods, these are often susceptible to hacking, unauthorized access, and tampering, leaving users without a reliable way to confirm whether a video is genuine. Furthermore, centralized systems lack transparency and can be manipulated by bad actors within or outside the organization.

Another challenge is the widespread distribution of fraudulent videos across various digital platforms. Social media, messaging applications, and video-sharing networks serve as key vectors for the spread of deceptive content. Misinformation campaigns using fake videos can cause reputational damage to businesses, mislead the public, and even influence financial markets. Without an efficient way to verify video authenticity at scale, organizations struggle to combat the rapid dissemination of manipulated content.

The absence of a unified, decentralized solution exacerbates the problem. Content authentication technologies are often fragmented across industries, requiring users to rely on proprietary tools or closed ecosystems that do not provide interoperability. For example, a financial institution may develop an internal video authentication system, but this system may not be accessible to customers or external stakeholders who need to verify the legitimacy of a video. This lack of accessibility hinders broader adoption and fails to provide a standardized approach to video verification.

Beyond financial institutions, the rise of AI-generated forgeries affects various industries, including media, law enforcement, cybersecurity, and corporate security. In the legal field, video evidence is frequently presented in court cases, and the ability to manipulate video content raises concerns about the authenticity of evidence. Without a robust verification mechanism, courts and legal professionals may face difficulties in determining whether video evidence has been altered, leading to potential miscarriages of justice.

Similarly, in the cybersecurity domain, fraudulent videos pose a major risk to digital security protocols. Phishing attacks that previously relied on fake emails or voice messages can now leverage deepfake videos to convincingly impersonate executives, government officials, or business leaders. This allows attackers to manipulate employees, customers, and partners into taking actions that compromise data security, financial assets, or sensitive information.

Another critical problem is the lack of real-time authentication tools that allow users to verify video authenticity on demand. Current verification processes are often cumbersome, requiring users to manually cross-check video sources, use forensic analysis tools, or rely on expert evaluations. These approaches are time-consuming, expensive, and impractical for everyday users, leaving them vulnerable to deception in fast-moving digital environments.

The proliferation of manipulated videos also affects digital rights management and intellectual property protection. Content creators, brands, and media companies struggle to prevent unauthorized alterations or reproductions of their videos. When a fraudulent actor modifies a legitimate video and distributes it as an original work, it becomes difficult for the rightful owner to prove authenticity and enforce intellectual property rights. This creates significant challenges for content ownership and brand protection.

Existing regulatory frameworks and content moderation policies on digital platforms have also failed to keep pace with the rapid advancement of AI-generated video manipulation. While some platforms attempt to detect and remove deepfake content, these measures are often reactive rather than proactive. Many fraudulent videos remain undetected until they have already caused harm, and the lack of robust, verifiable authentication mechanisms prevents platforms from effectively identifying manipulated content at scale.

The rise of quantum computing presents an additional risk to digital security, as traditional encryption methods may become obsolete in the face of quantum-enabled decryption techniques. As video authentication systems rely on cryptographic security measures, they must be designed to withstand future computational advancements. Without forward-looking security measures, even authenticated videos could become vulnerable to tampering in the coming years.

Another issue lies in the difficulty of tracking and tracing fraudulent video content once it has been distributed. Once a manipulated video is shared across multiple platforms, it becomes nearly impossible to trace its origin or determine who created it. This complicates efforts to hold bad actors accountable and makes it difficult for affected individuals or organizations to seek recourse against the spread of false information.

The growing sophistication of AI-powered video manipulation also means that even experienced professionals may struggle to identify fraudulent content with the naked eye. While traditional video forensics techniques rely on expert analysis of frame inconsistencies, lighting discrepancies, and unnatural facial movements, modern AI-generated deepfakes can replicate human expressions, speech, and behaviors with near-perfect accuracy. This renders manual detection methods ineffective, necessitating the development of advanced, automated authentication mechanisms. Moreover, as businesses and institutions increasingly rely on video content for remote interactions, fraudsters have more opportunities to target weaknesses in video authentication. Remote hiring, telemedicine, online education, and virtual identity verification services all depend on the ability to verify the authenticity of video communications. If these industries cannot reliably authenticate video content, the risks of identity fraud, false credentials, and misrepresentation will continue to rise.

Despite the critical nature of these challenges, there has been no widely adopted, decentralized, and tamper-proof solution to verify video authenticity in real time. The long-felt and unmet need for a secure, scalable, and universally accessible authentication system has left individuals, businesses, and institutions vulnerable to deception. Without an effective solution, digital trust continues to erode, and organizations face growing difficulties in protecting themselves and their customers from fraudulent video content.

SUMMARY OF THE INVENTION

The invention introduces a comprehensive blockchain-based system for authenticating digital video content, providing a secure and transparent method for verifying authenticity, preventing tampering, and ensuring traceability. As digital videos become an integral part of communication, financial transactions, legal proceedings, social media interactions, and entertainment, the need for a robust authentication system has never been greater. This invention creates a decentralized ledger that records authentication details for videos, ensuring that once a video is verified, it remains unalterable and permanently linked to its blockchain record. This eliminates reliance on centralized authentication systems, which can be manipulated or hacked, offering a more secure and scalable solution for video authentication.

At the core of the invention is the process of minting each authenticated video as a unique non-fungible token on the blockchain. By assigning a cryptographic identifier to every verified video, the system ensures that each piece of content has a unique and immutable digital fingerprint. This approach not only guarantees authenticity but also provides a permanent record of ownership and verification status. Because blockchain technology is decentralized, this method prevents unauthorized alterations and ensures transparency, allowing anyone to verify the authenticity of a video without relying on a single governing entity. The ability to store authentication records immutably on the blockchain eliminates the possibility of fraudsters altering records or forging authentication credentials, creating a trustworthy system that strengthens the security of digital content.

A key feature of the invention is its rotating digital watermark, which dynamically changes throughout the video's duration. Unlike traditional watermarks that remain static and can be removed or tampered with using editing software, the rotating digital watermark continuously updates in an unpredictable manner. This makes it significantly more difficult for fraudulent actors to extract, replicate, or forge a convincing fake video. The watermark is embedded at multiple levels within the video file, ensuring that it remains intact even if the video undergoes compression, resizing, or format changes. This multi-layered watermarking process integrates seamlessly with blockchain authentication, providing an added level of security by ensuring that any alteration to the video results in an immediate authentication failure when compared to the original blockchain record.

To protect the authentication system from evolving computational threats, the invention incorporates quantum-proof encryption algorithms. Traditional cryptographic security measures are vulnerable to advancements in quantum computing, which has the potential to break widely used encryption methods. By implementing encryption protocols that are resistant to quantum computing attacks, the invention ensures that the authentication process remains secure even as computational capabilities advance. This long-term security measure safeguards blockchain-minted authentication records, preventing unauthorized decryption or alteration of stored data. This encryption system is integrated directly into the watermarking process, making it virtually impossible for malicious actors to manipulate both the blockchain records and the embedded security features.

For widespread adoption and seamless integration across various industries, the invention includes a public application programming interface that allows third-party platforms to verify the authenticity of video content in real time. This API enables social media platforms, financial institutions, corporate security systems, legal organizations, and media companies to incorporate video authentication as a standard feature in their content management systems. The API ensures that uploaded or streamed videos can be instantly verified against blockchain records, enabling automated validation and reducing the risk of engaging with manipulated or fraudulent content. By providing an accessible and scalable authentication tool, this system fosters trust in digital video content while making verification a seamless and efficient process for businesses and individuals.

To empower users with direct control over video authentication, the invention features a mobile application that allows for real-time verification. The mobile app enables users to scan a video, retrieve its blockchain authentication record, and confirm its legitimacy before acting on the content. This feature is especially valuable for financial transactions, legal evidence verification, and media consumption, where immediate authentication is necessary. Additionally, the mobile application incorporates an artificial intelligence-powered anomaly detection system, which analyzes video content for irregularities such as unnatural facial movements, frame inconsistencies, and manipulated audio-visual elements. By combining AI-driven content analysis with blockchain authentication, the mobile application enhances fraud prevention and ensures that users can confidently verify video authenticity from their smartphones.

For real-time fraud prevention, the invention includes a browser plugin that continuously scans, detects, and verifies videos accessed through web browsers. This plugin operates in the background, analyzing video content on streaming platforms, social media networks, and digital news websites. When a user encounters a video, the plugin automatically checks its blockchain authentication status and alerts the user if the content has been tampered with or does not match its original verification record. This feature is particularly useful for preventing misinformation, fake news propagation, and fraudulent advertisements that rely on manipulated video content to mislead viewers. The browser plugin integrates seamlessly with online platforms, ensuring that authentication occurs without requiring manual intervention from users.

To enhance video content security and traceability, the invention embeds metadata-based content validation within video files. This metadata includes key authentication details such as timestamps, permissions, geographic restrictions, content ownership information, and usage rights. By embedding metadata directly into video objects, the invention ensures that authentication data travels with the video, providing a verifiable history of its origin and verification status. This prevents unauthorized redistribution, ensures compliance with digital rights management policies, and provides content creators with greater control over how their videos are used. Any attempt to modify the metadata results in an authentication failure, alerting stakeholders to potential tampering or unauthorized modifications.

The invention features a dual-layer validation mechanism that combines blockchain-based authentication with rotating digital watermarking. This multi-level security model ensures that even if one layer of authentication is compromised, the second layer remains intact to detect tampering. By integrating these two security measures, the system makes it exponentially more difficult for fraudulent actors to create convincing counterfeits of verified videos. The dual-layer approach enhances security while maintaining a seamless verification process, allowing both businesses and consumers to rely on the system for fraud detection and prevention.

To support businesses, content creators, and digital platforms in protecting their intellectual property, the invention introduces a brand protection infrastructure that provides centralized verification while enabling decentralized access for authentication. This system allows organizations to authenticate their videos and maintain control over their verification records while enabling external users to independently verify authenticity through blockchain data. This hybrid model enhances content security while promoting transparency, ensuring that digital media remains protected from forgery, misrepresentation, and unauthorized usage.

For forensic-level content verification, the invention includes a content traceability system that records a detailed history of video interactions, including origin verification, modification attempts, and access logs. This traceability function allows businesses, regulatory authorities, and security analysts to investigate the history of a video and determine whether it has been altered. By maintaining an auditable history of content authenticity, the system enables efficient fraud detection, legal evidence verification, and compliance monitoring.

To enhance the detection of fraudulent video content, the invention integrates an artificial intelligence-powered anomaly detection system. This AI engine continuously learns and adapts to new manipulation techniques, improving its ability to identify deepfake videos and unauthorized modifications. By analyzing thousands of video attributes, including motion patterns, texture inconsistencies, voice modulation, and digital artifacts, the AI system can quickly flag potentially fraudulent content for further verification. This automated detection mechanism significantly reduces the reliance on manual forensic analysis, making it easier for businesses and users to identify manipulated media.

To prevent unauthorized distribution of fraudulent videos, the invention provides an automated tamper detection notification system. This feature alerts relevant stakeholders whenever a video fails an authentication check or has been altered without authorization. Notifications can be sent to content owners, regulatory agencies, or businesses, allowing them to take immediate action to prevent the spread of fraudulent content. The system also supports automatic takedown requests for unauthorized copies of verified videos, ensuring that compromised content is swiftly removed from digital platforms.

To further enhance video security, the invention implements a real-time video fingerprinting system that generates a unique cryptographic identifier for every authenticated video. This digital fingerprint ensures that even minor modifications result in a detectable mismatch, making it virtually impossible for malicious actors to create counterfeits without triggering an authentication failure. This fingerprinting mechanism strengthens the integrity of the verification process, providing a highly effective tool for identifying and preventing video manipulation.

The invention is designed to be adaptable and future-proof, integrating the latest advancements in blockchain technology, artificial intelligence, and quantum-resistant cryptography. As new security threats emerge, the system is capable of evolving to incorporate enhanced security protocols, ensuring that video authentication remains robust, scalable, and effective. By providing a secure, decentralized, and tamper-proof authentication solution, the invention establishes a new standard for digital video integrity, protecting individuals, businesses, and institutions from the ever-growing threats of deepfake technology, video forgery, and digital deception.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, a method for authenticating digital video content using a blockchain-based system includes receiving, by a computing device, a video file to be authenticated. A hashing module of the computing device generates a cryptographic hash of the video file to produce a unique video hash. A blockchain node stores the unique video hash on a blockchain ledger as an immutable authentication record by appending the unique video hash to a new block and linking the new block to a previously stored block in the blockchain ledger. A watermarking module of the computing device embeds a rotating digital watermark into a plurality of frames of the video file, wherein the rotating digital watermark dynamically changes over time within the video file to prevent removal or forgery. An encryption module of the computing device applies a quantum-resistant encryption algorithm to encrypt the rotating digital watermark and the authentication record stored in the blockchain ledger.

An anomaly detection module of the computing device analyzes the plurality of frames of the video file using an artificial intelligence model trained to detect inconsistencies in facial movements, frame transitions, and other visual anomalies indicative of tampering or synthetic media generation. A blockchain node stores an authentication metadata record associated with the video file on the blockchain ledger, the authentication metadata record comprising the unique video hash, a timestamp, watermark validation data, and encryption verification data. A verification application provides access to the authentication metadata record via an application programming interface, wherein the application programming interface enables a third-party computing device to verify the authenticity of the video file by comparing a cryptographic hash of an input video file to the unique video hash stored in the blockchain ledger. A browser plugin executing on a user device validates a video file encountered in a web browser by transmitting a request to the application programming interface, receiving an authentication status, and generating a visual alert if the video file fails verification.

A tamper detection module of the computing device scans a stored copy of the video file at predetermined time intervals to detect unauthorized modifications by comparing a newly generated cryptographic hash of the stored copy to the unique video hash stored in the blockchain ledger. A fingerprinting module of the computing device generates a cryptographic video fingerprint for the video file based on perceptual hashing techniques, the cryptographic video fingerprint allowing identification of modified versions of the video file even when minor edits or compression have been applied. A content traceability module of the computing device tracks the distribution and modification history of the video file by recording access events, modification attempts, and verification status in the blockchain ledger.

An active watermarking module of the computing device embeds an active watermark into the video file, wherein the active watermark transmits a callback signal to a verification server when the video file is accessed or played on a user device, enabling real-time tracking of video usage. A verification application executing on a mobile device verifies the authenticity of the video file in real time by capturing the video file, generating a cryptographic hash of the captured video file, and comparing the cryptographic hash to the unique video hash stored in the blockchain ledger. A fraud detection module of the computing device issues an automatic fraud alert to a registered content owner or platform administrator if the anomaly detection module identifies inconsistencies in the video file or if the video file fails verification against the blockchain ledger.

In some arrangements, the rotating digital watermark embedded by the watermarking module comprises a multi-layered pattern that changes at predefined intervals based on a cryptographic key, wherein the cryptographic key is stored in the blockchain ledger and updated dynamically to enhance security against removal or manipulation.

In some arrangements, the encryption module applies a hybrid encryption technique comprising a combination of symmetric and asymmetric quantum-resistant encryption algorithms to protect the rotating digital watermark and the authentication metadata record stored in the blockchain ledger.

In some arrangements, the anomaly detection module utilizes a convolutional neural network and a recurrent neural network to analyze temporal and spatial inconsistencies in the plurality of frames of the video file, wherein the convolutional neural network detects frame-level visual artifacts and the recurrent neural network analyzes sequential inconsistencies in motion patterns.

In some arrangements, the verification application provides access to the authentication metadata record using a zero-knowledge proof mechanism, enabling third-party computing devices to verify authenticity without exposing the original video file or its cryptographic hash.

In some arrangements, the browser plugin executing on the user device further modifies the visual alert based on the level of detected tampering, wherein a minor anomaly triggers a yellow warning indicator and a significant manipulation triggers a red fraud alert with an automated content takedown request.

In some arrangements, the tamper detection module utilizes a decentralized consensus mechanism among multiple blockchain nodes to validate any modifications detected in a stored copy of the video file, ensuring that tamper detection cannot be altered or overridden by a single entity.

In some arrangements, the fingerprinting module applies perceptual hashing using deep hashing neural networks that generate feature-based cryptographic video fingerprints, allowing identification of visually similar video files despite format conversion, compression, or minor modifications.

In some arrangements, the content traceability module further records and stores geolocation metadata associated with each access event, providing an additional layer of verification by ensuring that the video file has not been accessed or modified from unauthorized locations.

In some arrangements, the active watermarking module embeds a self-destructing watermark that deactivates if the video file is played on an unverified device, wherein the self-destructing watermark triggers an authentication failure and logs the unauthorized playback attempt in the blockchain ledger.

In some arrangements, a system for authenticating digital video content using a blockchain-based authentication platform comprises a computing device configured to receive a video file to be authenticated. A hashing module of the computing device generates a cryptographic hash of the video file to produce a unique video hash. A blockchain node stores the unique video hash on a blockchain ledger as an immutable authentication record by appending the unique video hash to a new block and linking the new block to a previously stored block in the blockchain ledger.

A watermarking module of the computing device embeds a rotating digital watermark into a plurality of frames of the video file, wherein the rotating digital watermark dynamically changes over time within the video file to prevent removal or forgery. A cryptographic key storage in the blockchain ledger stores a cryptographic key associated with the rotating digital watermark, wherein the cryptographic key updates dynamically to enhance security against removal or manipulation. An encryption module of the computing device applies a hybrid encryption technique comprising a combination of symmetric and asymmetric quantum-resistant encryption algorithms to encrypt the rotating digital watermark and the authentication metadata record stored in the blockchain ledger.

An anomaly detection module of the computing device analyzes the plurality of frames of the video file using a convolutional neural network and a recurrent neural network to detect temporal and spatial inconsistencies, wherein the convolutional neural network detects frame-level visual artifacts and the recurrent neural network analyzes sequential inconsistencies in motion patterns. A blockchain metadata storage stores an authentication metadata record associated with the video file on the blockchain ledger, wherein the authentication metadata record comprises the unique video hash, a timestamp, watermark validation data, and encryption verification data.

A verification application provides access to the authentication metadata record using a zero-knowledge proof mechanism, wherein the zero-knowledge proof mechanism enables a third-party computing device to verify the authenticity of the video file without exposing the original video file or its cryptographic hash. A browser plugin executing on a user device validates a video file encountered in a web browser by transmitting a request to the verification application, receiving an authentication status, and generating a visual alert, wherein a minor anomaly detected in the video file triggers a yellow warning indicator and a significant manipulation detected in the video file triggers a red fraud alert with an automated content takedown request.

In some arrangements, the blockchain node is further configured to implement a multi-chain interoperability protocol, allowing the blockchain ledger to synchronize authentication metadata records across multiple blockchain networks to enhance redundancy and prevent data loss.

In some arrangements, the blockchain metadata storage further comprises a hierarchical data structure that categorizes authentication metadata records based on predefined classification parameters, including video content type, authentication timestamp, content ownership, and security level.

In some arrangements, the watermarking module is further configured to generate a perceptual-based adaptive watermarking pattern, wherein the perceptual-based adaptive watermarking pattern varies the opacity and placement of the rotating digital watermark based on video scene complexity to minimize visual disruption while maximizing security.

The following description and claims, in conjunction with the drawings-all integral parts of this specification-will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 is an exemplary system architecture diagram in accordance with one or more embodiments disclosed herein that illustrates a blockchain-based video authentication system configured to verify the authenticity, integrity, and security of digital video content using cryptographic hashing, rotating digital watermarking, AI-powered anomaly detection, and decentralized blockchain storage. The system further includes a verification application, a browser plugin, a mobile authentication module, and an active watermarking mechanism that enable real-time validation, fraud detection, and content traceability across multiple platforms.

FIG. 2 is an exemplary flow diagram in accordance with one or more embodiments disclosed herein that illustrates a blockchain-based video authentication process configured to verify the authenticity, integrity, and security of digital video content through cryptographic hashing, rotating digital watermarking, AI-powered anomaly detection, and decentralized blockchain storage. The process further includes fraud detection mechanisms, browser-based real-time verification, mobile authentication, active watermark tracking, and multi-chain interoperability to ensure tamper resistance, content traceability, and long-term video integrity.

FIGS. 3A-3D collectively represent an exemplary sequence diagram in accordance with one or more embodiments disclosed herein that illustrates the step-by-step interactions between various system components in a blockchain-based video authentication process, including video ingestion, cryptographic hashing, watermark embedding, AI-driven anomaly detection, decentralized blockchain storage, and verification. The diagram further details real-time fraud detection, tamper validation using consensus mechanisms, active watermark monitoring, browser-based authentication, and mobile verification, ensuring video integrity, traceability, and protection against manipulation.

FIG. 4 is an exemplary class diagram in accordance with one or more embodiments disclosed herein that illustrates the object-oriented architecture of a blockchain-based video authentication system, detailing the relationships between core components such as video ingestion, cryptographic hashing, dynamic watermarking, AI-driven anomaly detection, blockchain storage, and real-time fraud monitoring. The diagram defines multiple interconnected classes, including video processing, encryption, verification, tamper detection, consensus validation, fingerprinting, and predictive threat analysis, ensuring modularity, scalability, and security for protecting digital video content against unauthorized modifications and forgery.

DETAILED DESCRIPTION

The invention provides a comprehensive blockchain-based system for verifying the authenticity, integrity, and security of digital video content. This system is designed to prevent video forgery, manipulation, unauthorized modifications, and deepfake attacks by leveraging multiple layers of security, including cryptographic hashing, dynamic watermarking, artificial intelligence-based anomaly detection, decentralized blockchain storage, and real-time fraud monitoring. By integrating these technologies, the system ensures that digital video files remain tamper-resistant, traceable, and verifiable across various platforms while maintaining the privacy and security of authentication data. The system is designed to work seamlessly across different environments, including web-based video platforms, streaming services, legal forensic applications, and mobile verification systems, ensuring a scalable and effective authentication process.

The authentication process begins with the ingestion of a video file through a computing device, which serves as the central processing hub for the authentication workflow. The video file is analyzed to extract key metadata, including file name, resolution, duration, frame rate, and bit rate, to ensure compatibility with the authentication system. Once preprocessing is complete, a cryptographic hashing algorithm is applied to generate a unique digital fingerprint of the video. This fingerprint, also known as a cryptographic hash, serves as a tamper-proof identifier, ensuring that any future modifications to the video file will result in a completely different hash value. This cryptographic fingerprinting process provides an immutable baseline for video verification, allowing the system to detect even the smallest unauthorized changes.

To maintain the integrity of the authentication data, the cryptographic hash is transmitted to a blockchain node for decentralized storage. The blockchain node appends the hash to a new block in the blockchain ledger, where it is stored as a permanent and verifiable authentication record. Because blockchain technology operates as a decentralized and immutable ledger, it prevents any single entity from modifying, removing, or tampering with stored authentication records. Each new block in the blockchain is linked to the previous block, forming an unalterable chain of video authentication events that can be independently verified at any time. The decentralized nature of the blockchain ledger ensures that authentication records remain transparent, secure, and resistant to malicious interference.

In addition to cryptographic hashing, the system employs a dynamic watermarking module that embeds a rotating digital watermark into multiple frames of the video. Unlike conventional watermarking techniques that use static patterns, the dynamically rotating watermark changes at different intervals throughout the video, making it highly resistant to forgery and removal. This watermarking process ensures that even if an attacker attempts to alter the video while preserving its cryptographic hash, the watermark verification process will detect inconsistencies. The cryptographic key used to generate and validate the watermark is securely stored in the blockchain ledger, ensuring that the watermark remains verifiable for future authentication checks. The rotating watermark provides an additional layer of security by encoding metadata into the video itself, making it possible to identify tampered or unauthorized versions of the video.

To further enhance security, the system integrates an encryption module that protects authentication metadata using a combination of symmetric and asymmetric quantum-resistant encryption techniques. The encryption module ensures that the cryptographic hash, watermark data, and other authentication records remain protected against unauthorized access, tampering, and cyber threats, including those posed by future quantum computing advancements. The encryption module allows for the secure transmission and storage of authentication data while ensuring that only authorized users with the correct decryption keys can access the verification records. This multi-tier encryption approach safeguards video authentication data against both present and emerging security threats, preserving the integrity of authentication records over time.

The system incorporates an artificial intelligence-driven anomaly detection module that analyzes video frames for inconsistencies indicative of tampering, deepfake manipulation, or other forms of synthetic alterations. The anomaly detection module employs convolutional neural networks to analyze individual frames, detecting unnatural pixel distortions, compression artifacts, and lighting inconsistencies. Additionally, a recurrent neural network is used to analyze motion continuity across multiple frames, identifying unnatural transitions, frame skipping, and synchronization issues that may indicate digital tampering. By comparing detected anomalies against a database of known manipulation patterns, the system can accurately determine whether a video file has been altered. The results of the anomaly detection process are stored in the blockchain ledger to ensure that any detected fraud is permanently recorded and accessible for future forensic analysis.

The verification application serves as an interface that enables third-party entities to authenticate video content by querying the blockchain ledger. Through an application programming interface, content platforms, social media services, law enforcement agencies, and media organizations can verify the authenticity of a video by cross-referencing its cryptographic hash and watermark data with the stored blockchain authentication records. To ensure user privacy, the verification application employs a zero-knowledge proof engine that allows authentication to be confirmed without exposing the original cryptographic hash or video file. This zero-knowledge proof mechanism enables third-party entities to verify video authenticity while ensuring that sensitive authentication data remains confidential.

A browser plugin is included as part of the system to provide real-time fraud detection for videos viewed on web pages. The browser plugin operates by automatically scanning video content and comparing it to blockchain-stored authentication records to determine whether a video has been tampered with. If the system detects discrepancies between the played video and the blockchain record, the plugin generates an alert to warn users that the video may have been altered or manipulated. The plugin applies a multi-tier alert system, where minor inconsistencies result in a yellow warning indicator, while major manipulations trigger a red fraud alert. The fraud alert may initiate an automated content takedown request, preventing the spread of manipulated or fraudulent video content.

To ensure that stored video files remain unchanged over time, a tamper detection module periodically rehashes authenticated video files and compares them to their original blockchain-stored hash. If modifications are detected, the system utilizes a decentralized consensus validation mechanism that requires multiple blockchain nodes to verify whether the detected changes were authorized or indicate tampering. This consensus validation process prevents false positives and ensures that the tamper detection process cannot be overridden or manipulated by a single entity. The results of the consensus-based validation are stored in the blockchain ledger, ensuring that any tampered content is permanently flagged and recorded.

A fingerprinting module is included in the system to generate perceptual hashes for videos, allowing for the identification of visually similar or slightly modified versions of authenticated video files. This module employs advanced feature-based hashing techniques to enable the system to recognize versions of a video that have undergone compression, format conversion, or minor edits. The perceptual hash is then stored in the blockchain ledger, enabling future authentication and traceability of modified or derivative versions of a video.

The content traceability module maintains a log of all access attempts, modifications, and authentication queries related to a video, creating a verifiable audit trail for content ownership and distribution tracking. This module ensures that every interaction with a video is logged, providing transparency and accountability for content owners, legal authorities, and platform administrators. Additionally, the system records geolocation metadata for video access events, adding an extra layer of security by detecting unauthorized or suspicious access attempts.

To prevent unauthorized distribution and playback of verified video content, the system integrates an active watermarking module that embeds a traceable watermark into the video file. This active watermark transmits a callback signal to the verification server whenever the video is played on a device, allowing real-time monitoring of video playback events. If the video is played on an unverified device or an unauthorized platform, the system triggers an authentication failure and logs the event in the blockchain ledger. This ensures that content owners maintain control over the distribution and playback of their videos.

A mobile verification application allows users to authenticate videos in real time by capturing video content using their mobile devices and generating a cryptographic hash for comparison against the blockchain record. If inconsistencies are detected, the application provides an alert to the user indicating that the video may have been altered or manipulated. The fraud detection module continuously monitors system logs, anomaly detection reports, and authentication requests to detect emerging threats, issuing fraud alerts to registered content owners and platform administrators when potential fraud is detected.

To anticipate and mitigate evolving threats, the predictive threat analysis engine analyzes historical fraud patterns, blockchain activity, and AI-detected anomalies to identify emerging video manipulation techniques. The system continuously refines its detection algorithms using machine learning to adapt to new forms of deepfake and forgery methods. The predictive threat analysis engine ensures that the video authentication system remains adaptive and effective against new security threats.

The invention provides an advanced, scalable, and future-proof solution for securing digital video content. By integrating blockchain immutability, AI-driven fraud detection, cryptographic security, and real-time monitoring, the system ensures that video files remain tamper-proof, verifiable, and traceable across multiple platforms. The multi-layered security architecture provides a reliable and robust framework for preventing video manipulation, ensuring authenticity, and enabling transparent forensic analysis.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

In various configurations, terms such as "computers" and "machines" refer to devices that may be general-purpose or specialized for specific tasks, whether physical or virtual, and capable of network connectivity. These devices encompass all necessary hardware, software, and components known to skilled practitioners, including application-specific integrated circuits (ASICs), microprocessors, cores, or other processing units. These components execute, control, or implement various types of software, instructions, data, modules, processes, or routines. The terms used do not restrict the device type and should be broadly interpreted. Software, data, and executable code can reside on various physical, computer-readable storage devices, such as local memory, cloud-based storage, or network-attached storage. These can be stored in both volatile and non-volatile memory and may function autonomously or respond to specific triggers. These elements can be consolidated or distributed across multiple devices and stored in accessible memory systems such as distributed databases, big data infrastructures, blockchains, or distributed ledgers.

Networks and similar references refer to a broad range of communication systems, from local area networks (LANs) and wide area networks (WANs) to the Internet and cloud-based networks, supporting wired and wireless configurations. Specialized networks like digital subscriber line (DSL), frame relay, asynchronous transfer mode (ATM), and virtual private networks (VPN) are included. These networks utilize various hardware and software components, including modems, routers, firewalls, switches, and adapters, to facilitate communication. Networks are also equipped with virtual IP addresses and support multiple protocols like HTTPS, enabling effective packet-based data transmission and communication.

This disclosure includes multiple types of artificial intelligence (AI) technologies that enhance the blockchain-based video authentication system by enabling advanced anomaly detection, fraud prevention, and predictive threat analysis. The AI models used in the system include convolutional neural networks (CNNs), recurrent neural networks (RNNs), generative adversarial networks (GANs), and machine learning models, each serving a distinct purpose in the authentication process. These AI-driven technologies work in conjunction with cryptographic security, watermarking, and blockchain storage to ensure the integrity and authenticity of digital video content.

Convolutional Neural Networks (CNNs) are a type of deep learning model designed for image and video analysis. CNNs are particularly effective at identifying patterns in images, making them useful for detecting spatial anomalies in individual video frames. In the disclosed invention, CNNs analyze video frames at a pixel level to detect unnatural artifacts, compression distortions, lighting mismatches, and frame modifications that may indicate tampering or synthetic alterations. For example, a CNN model such as ResNet (Residual Networks), VGGNet (Visual Geometry Group Network), or EfficientNet could be utilized to scan video frames for inconsistencies. The CNNs process each frame through multiple layers of feature extraction, identifying subtle discrepancies that may not be detectable through traditional forensic analysis. This capability is particularly useful for detecting deepfake videos, where synthetic facial expressions or lighting inconsistencies may appear across frames.

Recurrent Neural Networks (RNNs) are another form of deep learning model designed for processing sequential data, such as video sequences. Unlike CNNs, which focus on spatial analysis of individual frames, RNNs analyze temporal patterns by evaluating how frames change over time. The invention utilizes RNNs to detect motion inconsistencies, unnatural frame transitions, synchronization errors, and frame insertions or deletions that may indicate manipulation. A specialized form of RNN, such as a Long Short-Term Memory (LSTM) network or Gated Recurrent Unit (GRU), may be used to model the expected motion patterns in a video. For instance, if a person's facial expressions appear unnaturally smooth or robotic due to deepfake manipulation, an LSTM model could detect the irregularity based on learned motion behaviors. This AI-driven approach enhances the anomaly detection module by providing a robust method for identifying frame-by-frame and motion-based tampering techniques.

Generative Adversarial Networks (GANs) are a class of AI models that involve two competing neural networks, a generator and a discriminator, which work together to generate and detect synthetic content. GANs are widely used in deepfake creation, but in the disclosed invention, GANs are leveraged for fraud detection and deepfake recognition. The fraud detection module utilizes GANs to generate synthetic deepfake videos and compare them against real video footage to detect signs of manipulation. Examples of GAN architectures that may be employed include StyleGAN, CycleGAN, and ProGAN, which are known for their ability to produce highly realistic but artificially generated images and videos. By training a GAN on authentic and manipulated video datasets, the system can develop a deepfake detection model capable of identifying manipulated content with high precision. This approach allows the invention to stay ahead of emerging threats by continuously training against evolving deepfake techniques.

Machine Learning Models play a crucial role in predictive fraud analysis by identifying patterns in video authentication data and detecting suspicious activity before it becomes a widespread threat. The predictive threat analysis engine in the invention uses machine learning models such as random forests, support vector machines (SVMs), decision trees, and deep learning-based anomaly detection models to analyze historical fraud patterns, blockchain activity, and anomaly detection logs. By examining past fraudulent activity and manipulation trends, the system can predict emerging attack vectors, recognize high-risk content, and automatically update detection models to adapt to new forms of video forgery. A practical example of a machine learning model used in the invention may include XGBoost (Extreme Gradient Boosting) or LightGBM (Light Gradient Boosting Machine), both of which are highly efficient in classifying fraudulent behaviors based on large-scale datasets.

Each of these AI-driven components is integrated into various aspects of the invention. The CNNs and RNNs form the foundation of the anomaly detection module, which actively scans video content for inconsistencies at both the frame and motion levels. The GAN-based fraud detection module strengthens the system's ability to recognize deepfake manipulation by comparing real and synthetic videos. The predictive threat analysis engine, powered by machine learning models, enables the system to evolve and detect new fraud trends, emerging deepfake technologies, and novel attack techniques. Additionally, these AI systems interact with blockchain storage, ensuring that all detected anomalies, fraud alerts, and authentication metadata are permanently recorded and immutably stored for future verification.

The disclosed invention creates a multi-layered AI-powered authentication system that enhances video security, detects deepfake manipulation, and proactively prevents video forgery. By integrating CNNs for spatial analysis, RNNs for motion consistency detection, GANs for deepfake fraud prevention, and machine learning models for predictive fraud detection, the invention ensures a highly adaptive, scalable, and robust framework for securing digital video content in real-time. These AI-driven techniques enable the system to maintain a high level of accuracy, reduce false positives in video authentication, and continuously improve detection capabilities through machine learning updates. The incorporation of AI makes the disclosed system future-proof against evolving threats, ensuring that video authentication remains secure, transparent, and verifiable in an increasingly digital and AI-driven world.

FIG. 1 illustrates a comprehensive blockchain-based video authentication system designed to provide a tamper-resistant, verifiable, and immutable framework for securing digital video content. The system incorporates multiple interdependent components that handle video ingestion, processing, cryptographic authentication, blockchain storage, verification, real-time fraud detection, and content tracking. Each element of the system is essential for ensuring that digital videos cannot be manipulated, counterfeited, or distributed fraudulently while also enabling seamless verification by authorized entities.

The system architecture diagram of FIG. 1 presents a detailed blockchain-based video authentication system designed to ensure the security, authenticity, and integrity of digital video content. The system functions as a decentralized, tamper-resistant verification mechanism that prevents unauthorized modifications, detects fraudulent activity, and provides immutable proof of video authenticity. Each component in the system is responsible for specific tasks related to the ingestion, processing, storage, validation, and tracking of digital video files. All components work together in a structured manner to establish a robust authentication framework. The system ensures that every video submitted for authentication undergoes multiple layers of verification, including cryptographic hashing, dynamic watermark embedding, anomaly detection, blockchain storage, consensus-based tamper detection, and real-time verification. This design provides an unparalleled level of security against deepfake manipulation, content forgery, unauthorized modifications, and fraudulent distribution.

FIG. 1 illustrates a blockchain-based video authentication system that ensures the integrity, authenticity, and security of digital video content by integrating multiple components that handle video ingestion, cryptographic authentication, blockchain-based verification, anomaly detection, and tamper detection. Each element in the system is designed to function collaboratively to prevent unauthorized modifications, deepfake manipulations, and fraudulent content distribution while ensuring a reliable and verifiable authentication process.

At the core of the system is the computing device (100), which acts as the central processing unit responsible for managing all video authentication operations. The computing device (100) can be implemented using high-performance cloud-based computing services such as Amazon Web Services EC2, Google Cloud Compute Engine, or Microsoft Azure Virtual Machines, all of which provide scalable and efficient processing power for handling authentication requests. Alternatively, on-premises servers equipped with GPUs, such as NVIDIA A100 Tensor Core GPUs or Google's Tensor Processing Units, can be used to enhance the processing speed of AI-based video analysis and cryptographic operations. The computing device (100) is responsible for interacting with various subsystems to handle video intake, generate cryptographic hashes, apply watermarking, analyze video integrity through artificial intelligence models, encrypt authentication metadata, and ensure that verification records are immutably stored on the blockchain ledger (108). The computing device (100) executes various cryptographic algorithms, deep learning-based anomaly detection models, and blockchain smart contract functions to maintain the security and reliability of the authentication process.

Videos enter the system through the video input module (102), which serves as the primary interface for receiving video files. The video input module (102) enables users to upload video content from multiple sources, including local storage devices, mobile applications, cloud storage platforms, streaming services, and external content repositories. It can be implemented using RESTful API-based video ingestion systems that allow integration with third-party services, such as Amazon S3, Google Cloud Storage, and Microsoft Azure Blob Storage, ensuring that videos are securely uploaded and prepared for authentication. The video input module (102) processes the incoming video files to ensure compatibility with system requirements by performing format validation, resolution adjustment, and compression checks. It supports various video file formats, including MP4, AVI, MKV, and MOV, and ensures that each uploaded file is structured in a way that allows seamless cryptographic processing.

Once the video is received and formatted correctly, it is transmitted to the hashing module (104), which generates a cryptographic hash that uniquely identifies the video file. The hashing module (104) applies secure cryptographic hashing algorithms, such as SHA-256, SHA-3, or BLAKE3, to generate a fixed-length hash value that serves as a digital fingerprint of the video. This hash ensures that even the smallest modification to the video results in a completely different hash value, making unauthorized alterations immediately detectable. Cryptographic hash generation can be implemented using cryptographic libraries such as OpenSSL for SHA-256, the Keccak library for SHA-3, or the Rust-based BLAKE3 hashing function, which is optimized for high-speed cryptographic operations. Once the cryptographic hash is generated, it is forwarded to the blockchain node (106) for secure recording.

The blockchain node (106) serves as a bridge between the authentication system and the blockchain ledger (108), ensuring that cryptographic hashes and authentication metadata are immutably stored in a decentralized and tamper-resistant manner. The blockchain node (106) is responsible for transmitting video authentication data to the blockchain ledger (108), which maintains a distributed and verifiable record of all authentication events. The blockchain ledger (108) is implemented using blockchain networks such as Ethereum, which supports smart contract-based verification, Hyperledger Fabric for enterprise-grade blockchain storage, or Solana for high-speed and scalable blockchain transactions. The blockchain ledger (108) ensures that authentication records cannot be deleted, modified, or manipulated by unauthorized entities, preserving a transparent and auditable record of video verification events. To further enhance security, the system includes a watermarking module (110) that embeds a dynamic watermark into multiple frames of the video. Unlike traditional static watermarking techniques, the watermarking module (110) applies a rotating digital watermark that changes over time, making it resistant to removal or forgery. The watermarking module (110) can be implemented using OpenCV for frame-based watermark embedding, MATLAB Image Processing Toolbox for advanced watermarking techniques, or PyWavelets for wavelet-based transformations that integrate the watermark directly into the video's spatial and frequency domains. The cryptographic key storage (112) is responsible for securely managing the encryption keys required to generate and validate the dynamic watermark. Secure key management solutions such as AWS Key Management Service, Google Cloud KMS, and YubiHSM hardware security modules can be used to store and manage cryptographic keys securely. The cryptographic key storage (112) ensures that the watermarking keys remain protected from unauthorized access while enabling secure verification of watermarked content.

To maintain the confidentiality and integrity of authentication metadata, the encryption module (114) encrypts all authentication records using hybrid encryption techniques. This module applies symmetric encryption algorithms such as AES-256 to protect authentication metadata while using asymmetric encryption methods such as RSA or elliptic curve cryptography (ECC) for secure key exchange and decryption authorization. The encryption module (114) can be implemented using cryptographic libraries such as OpenSSL for RSA encryption, PyCryptodome for AES-based security, and the Libsodium cryptographic library for ECC-based encryption. The encryption module (114) ensures that only authorized entities with the correct decryption keys can access the verification data stored within the blockchain ledger (108).

The anomaly detection module (116) is responsible for detecting video manipulation, deepfake alterations, and other unauthorized modifications using artificial intelligence. This module employs convolutional neural networks to analyze video frames for spatial inconsistencies, such as unnatural artifacts, lighting mismatches, and pixel-level distortions indicative of deepfake modifications. Additionally, the anomaly detection module (116) uses recurrent neural networks to examine motion continuity across video frames, detecting unnatural transitions, frame skipping, and synchronization errors. Implementing this module involves using deep learning frameworks such as TensorFlow for CNN-based spatial analysis, PyTorch-based LSTMs for motion consistency evaluation, and Google's DeepFake Detection Challenge dataset for training fraud detection models. The anomaly detection module (116) continuously updates its fraud detection algorithms to adapt to evolving deepfake techniques and advanced video manipulation strategies.

The blockchain metadata storage (118) maintains detailed records of all authentication events, including cryptographic hashes, watermark validation data, encryption verification logs, and blockchain access records. The verification application (120) provides third-party access to authentication metadata, enabling external entities such as media organizations, forensic investigators, and content platforms to verify the authenticity of video files. To preserve privacy, the verification application (120) integrates a zero-knowledge proof engine (122), which enables verification without exposing sensitive cryptographic hash data or video content. The zero-knowledge proof engine (122) can be implemented using zk-SNARKs with libsnark or zk-STARKs using StarkWare's STARK Prover, ensuring that authentication verification remains confidential and secure.

To facilitate real-time verification, the system includes a browser plugin (124) that automatically scans and authenticates video files played within web browsers. The browser plugin (124) queries the verification application (120) to retrieve blockchain-stored authentication records. If a video does not match the stored verification data, the browser plugin (124) triggers an alert, issuing warnings such as yellow alerts for minor inconsistencies and red alerts for detected fraud. The browser plugin (124) can be implemented using JavaScript and WebAssembly for lightweight execution, with frameworks such as the Chrome Extensions API, Mozilla WebExtensions, and Edge Add-ons.

The tamper detection module (126) periodically revalidates stored video files by recomputing their cryptographic hash and comparing it to the original blockchain-stored hash. If discrepancies are found, the tamper detection module (126) flags the video as altered. Implementations of this module include cryptographic hash comparison techniques, Merkle tree-based verification, and AI-based anomaly detection models that enhance tamper detection accuracy. The tamper detection module (126) ensures that authenticated videos remain unchanged over time, providing long-term integrity and verifiability of digital content.

FIG. 1 includes a decentralized consensus validation mechanism (128), which is a critical component that ensures the integrity and reliability of the tamper detection process. The decentralized consensus validation mechanism (128) functions by distributing verification tasks across multiple blockchain nodes to confirm whether a detected modification in a video file is legitimate. Instead of relying on a single authority or centralized verification system, this mechanism leverages a decentralized network of independent validators to verify authentication data before determining whether a video has been tampered with. By implementing consensus algorithms such as Practical Byzantine Fault Tolerance (PBFT), Proof of Stake (POS), or Proof of Authority (PoA), the system ensures that only verified alterations are flagged as tampered while preventing attackers from falsely overriding authentication records. The use of consensus-based verification enhances security, prevents single points of failure, and maintains the transparency of the authentication process by ensuring that verification results remain immutable and auditable on the blockchain.

The fingerprinting module (130) is responsible for generating a perceptual hash of video content, allowing the system to identify videos that have been slightly modified but still retain visual similarities to their original versions. Unlike traditional cryptographic hashes that change entirely with even a single-bit modification, perceptual hashes capture essential structural and content-based features of a video to detect unauthorized alterations that may be subtle, such as re-encoding, resizing, or format conversions. This module enables content owners and verification platforms to trace the distribution of a video across different formats while still ensuring its authenticity. Implementation of the fingerprinting module (130) can be achieved through image and video perceptual hashing techniques, such as the pHash algorithm for detecting similar content, dHash for fast difference hashing, or machine learning-based deep hashing methods using convolutional neural networks. The fingerprinting module (130) is particularly useful in forensic video analysis, enabling investigators to track manipulated content even when common digital obfuscation techniques are applied.

The deep hashing neural network (132) is an advanced fingerprinting mechanism that enhances perceptual hashing by using artificial intelligence to generate unique cryptographic fingerprints based on deep learning feature extraction. Unlike traditional hashing methods, which rely on pixel-based transformations, the deep hashing neural network (132) applies machine learning techniques to extract robust and tamper-resistant feature representations of video content. This module employs convolutional neural networks (CNNs) trained on large datasets to recognize spatial, temporal, and contextual patterns in videos, ensuring that even advanced modifications, such as deepfake alterations, do not escape detection. The deep hashing neural network (132) can be implemented using deep learning frameworks such as TensorFlow and PyTorch, utilizing pre-trained models such as ResNet, EfficientNet, and VGG-16 for extracting video fingerprints. By integrating feature-based hashing techniques, the deep hashing neural network (132) significantly improves the system's ability to identify manipulated content with high accuracy and minimal false positives.

The content traceability module (134) provides an immutable record of all interactions with a video, ensuring that every instance of access, modification, distribution, or playback is logged for future reference. This module is designed to track the entire lifecycle of a video file, from its original upload and authentication to any subsequent verification attempts or tampering alerts. The content traceability module (134) functions by recording transaction logs on the blockchain, maintaining an auditable history that allows forensic investigators, content creators, and security teams to analyze access patterns and detect unauthorized modifications. This module can be implemented using blockchain-based logging mechanisms such as Hyperledger Fabric's ledger API for maintaining detailed access records, IPFS for decentralized storage of metadata logs, or Neo4j graph databases for visualizing content interactions. By providing an immutable record of all video authentication events, the content traceability module (134) ensures that digital media remains accountable and verifiable across its entire distribution chain.

The geolocation metadata storage (136) enhances security by associating geolocation data with video access events, allowing the system to detect unauthorized access attempts based on location anomalies. This module records the geographic origin of every authentication request, ensuring that videos are not accessed or modified from suspicious locations known for cyberattacks or content forgery. By analyzing geolocation metadata, the system can automatically flag high-risk access attempts, restrict video authentication requests from blacklisted regions, or notify content owners of unusual activity. Implementation of the geolocation metadata storage (136) can be achieved using IP geolocation services such as MaxMind GeoIP, Google Maps API for precise location tracking, or AWS Geolocation for mapping blockchain-based verification logs to physical locations. This component provides an additional layer of fraud detection by identifying unusual access behaviors that could indicate unauthorized distribution or tampering.

The active watermarking module (138) introduces a security measure that embeds an active watermark into a video file, transmitting a callback signal whenever the video is played on a user's device. This watermark serves as a real-time authentication mechanism that allows content owners to monitor video playback activity, ensuring that only verified devices and platforms are able to access the video. Unlike traditional watermarks that are passively embedded into video frames, the active watermarking module (138) continuously interacts with the verification server to confirm whether the video is being played under authorized conditions. This module can be implemented using dynamic watermarking frameworks such as Digimarc Barcode for real-time tracking, forensic watermarking techniques used in digital rights management (DRM) systems, or blockchain-based watermark authentication services. By enabling continuous verification during playback, the active watermarking module (138) helps prevent unauthorized video distribution and content piracy.

The self-destructing watermark (140) provides an additional layer of security by embedding a verification-dependent watermark that automatically deactivates if the video file is played on an unverified device. This module ensures that video files cannot be accessed outside of authorized environments, making it impossible for attackers to distribute unauthorized copies without triggering an authentication failure. The self-destructing watermark (140) can be implemented using cryptographic key-based watermarking, where playback authorization is granted only if the correct authentication key is provided. This can be achieved using AES-128 or AES-256 encryption techniques, where decryption keys are issued dynamically based on real-time verification checks. By automatically disabling playback in unauthorized environments, the self-destructing watermark (140) protects against unauthorized redistribution and unauthorized viewing of protected video content.

The mobile verification application (142) allows users to verify the authenticity of videos using their mobile devices by scanning video files and comparing their cryptographic hashes against blockchain-stored records. This application provides a lightweight verification interface that enables users to authenticate videos in real time, ensuring that modified or deepfake content is detected instantly. The mobile verification application (142) can be implemented using blockchain query libraries such as Web3.js for Ethereum-based lookups, QR code-based verification mechanisms for easy user interaction, or AI-powered fraud detection models embedded within mobile applications. By making authentication accessible through mobile devices, this module enhances security while providing users with an easy-to-use verification tool. The fraud detection module (144) continuously analyzes blockchain authentication logs, anomaly detection results, and video verification requests to identify potential fraud attempts. This module utilizes machine learning algorithms to detect patterns indicative of fraud, such as repeated verification failures, anomalous access requests, or deepfake characteristics. Implementation of the fraud detection module (144) can be achieved using predictive analytics tools such as AWS Fraud Detector, machine learning frameworks like XGBoost for fraud risk prediction, and anomaly detection networks such as autoencoders for real-time threat detection. The fraud detection module (144) ensures that content owners and verification platforms are notified whenever suspicious activity is detected.

The multi-chain interoperability protocol (146) is a key component that enables the authentication system to function across multiple blockchain networks, ensuring that authentication records remain accessible, verifiable, and tamper-resistant regardless of the underlying distributed ledger technology. This component allows the system to bridge different blockchain ecosystems, enabling cross-chain validation and interoperability between permissioned and public blockchain networks. The multi-chain interoperability protocol (146) prevents vendor lock-in and ensures that video authentication data remains decentralized and resilient to changes in blockchain infrastructure. This module can be implemented using interoperability frameworks such as Polkadot's relay chain, which facilitates seamless communication between different blockchains, Cosmos SDK, which provides a modular framework for building interoperable blockchain applications, or Chainlink decentralized oracles, which allow authentication data to be verified across multiple blockchain environments. By integrating these cross-chain communication mechanisms, the system ensures that authentication records remain universally accessible, even if a particular blockchain network becomes deprecated or experiences downtime.

The hierarchical data classification engine (148) is responsible for organizing authentication metadata based on predefined classification models, allowing for efficient data retrieval, forensic analysis, and risk assessment. The hierarchical data classification engine (148) structures authentication data into multi-tiered categories, such as video format, source integrity, fraud risk level, and verification status. By categorizing authentication records, the system enhances query efficiency, allowing investigators and verification platforms to quickly retrieve relevant authentication data. This module can be implemented using scalable database management solutions such as Elasticsearch for real-time metadata indexing, Apache Cassandra for distributed data storage, or Neo4j graph databases for relationship-based classification of authentication records. The hierarchical data classification engine (148) allows the system to automatically assign a risk score to each video based on prior authentication history, anomaly detection results, and fraud likelihood. This structured approach enables seamless integration with machine learning-driven analytics tools that assess the credibility of a video based on multiple classification parameters.

The adaptive watermarking system (150) enhances the resilience of watermarking techniques by dynamically adjusting watermark parameters based on detected attack patterns. Traditional watermarking techniques embed static identifiers that can often be removed or modified by sophisticated attackers using adversarial learning techniques. The adaptive watermarking system (150) mitigates this risk by leveraging artificial intelligence to modify the embedded watermark in response to detected tampering attempts. For example, if a watermark removal attempt is detected, the system can reapply a modified watermark with increased robustness or introduce multiple layers of redundant watermarking to preserve authenticity. This module can be implemented using reinforcement learning-based watermarking strategies, where an AI model trained using TensorFlow or PyTorch continuously adapts the watermarking strategy to prevent removal. Additionally, adversarial training techniques can be applied using generative adversarial networks (GANs) to develop watermarking schemes that are resistant to attacks, ensuring that video content remains protected against unauthorized modifications.

The generative adversarial network detection engine (152) is designed to detect deepfake videos and AI-generated manipulations by analyzing synthetic content characteristics. As deepfake technologies become more sophisticated, attackers can generate realistic but fraudulent video content that is indistinguishable to the human eye. The generative adversarial network detection engine (152) mitigates this risk by using AI-powered classification models that can distinguish between real and synthetically generated video frames. This module can be implemented using pre-trained deepfake detection models such as XceptionNet, MesoNet, and EfficientNet, all of which have been optimized for detecting GAN-generated content. Additionally, the system can leverage datasets such as FaceForensics++ and DeepFake Detection Challenge (DFDC) to train AI models to recognize unique patterns in manipulated videos. The generative adversarial network detection engine (152) continuously updates its detection capabilities by retraining its classification models using the latest deepfake attack samples, ensuring that it remains effective against emerging AI-generated forgery techniques.

The reputation-based verification scoring system (154) is responsible for assigning a credibility score to each authenticated video based on its authentication history, user feedback, and anomaly detection reports. This scoring system helps prioritize high-risk verification cases by providing a quantitative assessment of a video's authenticity. The reputation-based verification scoring system (154) functions by aggregating multiple trust signals, such as the frequency of verification failures, the presence of detected anomalies, and the consistency of metadata associated with the video. This module can be implemented using Bayesian probability models, which calculate a dynamic trust score based on prior authentication events, Page Rank-inspired ranking algorithms that assign credibility based on interconnected verification history, or machine learning-based trust models that analyze behavioral patterns associated with fraudulent content. The reputation-based verification scoring system (154) can be integrated with blockchain identity management systems to track the historical credibility of a content creator, ensuring that trusted content sources receive higher verification scores while suspicious sources undergo more rigorous scrutiny.

The machine learning-based risk assessment engine (156) continuously evaluates fraud risks associated with video authentication attempts by analyzing authentication logs, fraud detection patterns, and anomaly reports. This module functions by applying predictive analytics to assess the probability that a given video has been tampered with, allowing the system to proactively flag high-risk content for additional verification. The machine learning-based risk assessment engine (156) can be implemented using supervised learning models such as XGBoost, LightGBM, or CatBoost, which analyze historical authentication data to predict fraudulent activity. Additionally, unsupervised anomaly detection techniques, such as autoencoders and Gaussian mixture models, can be used to detect irregular authentication patterns without requiring labeled training data. This module continuously refines its risk assessment models using real-time feedback from the anomaly detection module (116) and the fraud detection module (144), ensuring that the authentication system adapts to evolving fraud techniques.

The augmented reality overlay interface (158) introduces a novel approach to authentication transparency by allowing users to visualize authentication metadata through an augmented reality interface. Instead of displaying verification details in a traditional text-based format, this module overlays authentication information directly onto the video playback screen, providing users with an interactive way to assess authenticity. The augmented reality overlay interface (158) can be implemented using AR frameworks such as Apple's ARKit for iOS, Google's ARCore for Android, or Microsoft Hololens for mixed reality applications. When a video is played on a compatible device, the AR interface displays real-time verification data, such as blockchain authentication status, watermark validation results, and anomaly detection insights, ensuring that users can easily verify the integrity of the content. By integrating augmented reality technology into the authentication process, this module enhances user engagement while providing an intuitive method for assessing video authenticity.

These components collectively enhance the blockchain-based video authentication system by integrating advanced security measures, AI-driven fraud detection, and next-generation verification techniques. The multi-chain interoperability protocol (146) ensures that authentication records remain decentralized and accessible across multiple blockchain ecosystems, while the hierarchical data classification engine (148) optimizes authentication metadata management for efficient retrieval. The adaptive watermarking system (150) and self-evolving watermarking techniques ensure that embedded security features remain robust against removal attempts, while the generative adversarial network detection engine (152) continuously analyzes AI-generated forgeries to prevent deepfake manipulation. The reputation-based verification scoring system (154) assigns trust scores to video content based on past authentication history, and the machine learning-based risk assessment engine (156) continuously adapts fraud detection models to evolving attack strategies. Finally, the augmented reality overlay interface (158) revolutionizes user interaction with authentication data by providing an immersive verification experience. Through the integration of these components, the blockchain-based video authentication system provides a scalable, future-proof solution for ensuring the authenticity, integrity, and security of digital video content in an increasingly AI-driven digital landscape.

The predictive threat analysis engine (160) leverages artificial intelligence to evaluate emerging fraud techniques, deepfake evolution trends, and blockchain activity patterns to predict future security threats. This engine continuously refines its fraud detection models using reinforcement learning, ensuring that the authentication system adapts to new attack methods and manipulation techniques. The predictive threat analysis engine (160) can be implemented using AI-powered cybersecurity analytics platforms, reinforcement learning models such as Proximal Policy Optimization (PPO), and blockchain analytics tools that monitor network-wide fraudulent behavior. This component ensures that the authentication system remains proactive, continuously evolving to counteract emerging threats in video authentication. The integration of all these components in FIG. 1 establishes a scalable, secure, and tamper-resistant authentication framework that protects digital video content from manipulation, forgery, and unauthorized distribution while providing a transparent verification process.

The flow diagram of FIG. 2 illustrates an exemplary blockchain-based video authentication process that ensures digital video content remains secure, verifiable, and resistant to tampering. The system integrates cryptographic hashing, rotating watermark embedding, artificial intelligence-driven anomaly detection, decentralized blockchain storage, consensus-based tamper validation, active watermark tracking, and multi-platform verification. The process is designed to detect deepfake manipulation, prevent unauthorized modifications, and create an immutable authentication record for digital video content. The authentication process is structured to allow real-time verification, continuous fraud monitoring, and long-term content traceability, making it a comprehensive security solution for protecting digital media.

The process begins with the initiation of the video authentication workflow (200). A computing device receives the digital video file from a user, content provider, streaming platform, or third-party system (202). The video file can be sourced from multiple input channels, including direct upload, cloud storage, a mobile device camera, or an embedded video capture system. Once received, the system preprocesses the video for authentication (204). This preprocessing step ensures that the video meets format requirements, extracts key frames for analysis, and prepares the content for cryptographic processing. The preprocessing module detects potential encoding artifacts and normalizes the video format to ensure consistency before further processing.

The hashing module generates a cryptographic hash of the video file (206). This hash is created using a secure cryptographic algorithm that converts the video data into a unique digital fingerprint. Any modification to the video, no matter how minor, results in a completely different cryptographic hash, making it impossible to alter the content without detection. The blockchain node then stores the cryptographic hash in the blockchain ledger as an immutable authentication record (208). The blockchain ledger maintains a tamper-proof history of authenticated video files, ensuring that verification can be performed at any point in the future. Each new video hash is appended to a new block and linked to the previous block in the chain, preserving a chronological and verifiable record of authentication events.

To prevent unauthorized modifications, the watermarking module embeds a dynamically changing rotating digital watermark into multiple frames of the video (210). The rotating digital watermark can continuously change over time, making it extremely difficult for attackers to remove or forge without detection. This watermark serves as an embedded security feature that protects the video at the frame level, ensuring that alterations can be identified through watermark integrity checks. The cryptographic key associated with the rotating watermark is securely stored in the blockchain ledger (212). This key is dynamically updated at predefined intervals, ensuring that only authorized users can verify and validate the watermark. The encryption module applies a hybrid quantum-resistant encryption technique to protect the rotating digital watermark and authentication metadata stored in the blockchain ledger (214). The encryption system can utilize both symmetric and asymmetric cryptographic algorithms to prevent brute-force attacks, ensuring long-term security against evolving cyber threats.

The encryption module applies a hybrid quantum-resistant encryption technique to protect the rotating digital watermark and authentication metadata stored in the blockchain ledger (214). This hybrid approach combines traditional cryptographic algorithms with post-quantum cryptographic methods to ensure long-term security against both classical and quantum computing attacks. One example of implementing this hybrid quantum-resistant encryption technique is to use AES-256 (Advanced Encryption Standard) for symmetric encryption of the rotating digital watermark and authentication metadata while securing the encryption keys using a post-quantum asymmetric encryption scheme such as CRYSTALS-Kyber or FrodoKEM. In this approach, AES-256 provides fast and efficient encryption, while Kyber or FrodoKEM ensures that key exchanges remain resistant to quantum attacks.

Another example is to apply a lattice-based cryptographic method, such as NTRUEncrypt, in conjunction with elliptic curve cryptography (ECC) to create a hybrid encryption framework. In this scenario, NTRUEncrypt provides quantum-resistant public key encryption, while ECC ensures compatibility with current cryptographic standards, making the system resilient against both classical and quantum decryption methods.

A third approach involves leveraging hash-based digital signatures, such as SPHINCS+, for authentication metadata verification, while using a classical encryption scheme like RSA-4096 for backward compatibility with existing systems. This technique ensures that while authentication records remain verifiable under classical cryptographic standards, they also gain the additional security of hash-based quantum-resistant signatures.

Another example is using a code-based cryptographic algorithm, such as Classic McEliece, to encrypt long-term authentication metadata stored in the blockchain ledger while using AES-GCM (Galois/Counter Mode) for encrypting the rotating digital watermark. Classic McEliece provides security based on error-correcting codes, which are known to be resistant to quantum attacks, while AES-GCM ensures high-speed symmetric encryption with authentication capabilities.

A final approach could integrate super-singular isogeny key exchange (SIKE) to protect key exchange processes, ensuring that even if a quantum computer breaks traditional Diffie-Hellman or RSA-based key exchanges, SIKE remains secure. This method can be paired with a symmetric encryption algorithm like ChaCha20-Poly1305, which provides authenticated encryption for protecting the digital watermark against unauthorized access while maintaining high-speed encryption. By combining these quantum-resistant encryption techniques with traditional cryptographic methods, the encryption module ensures that both the rotating digital watermark and authentication metadata remain protected against future quantum attacks while maintaining compatibility with current security standards.

The anomaly detection module performs an artificial intelligence-driven analysis of the video file to detect potential tampering (216). This module employs a convolutional neural network (CNN) and a recurrent neural network (RNN) to detect frame-level and motion-based inconsistencies indicative of manipulation. The CNN detects unnatural pixel distortions, compression artifacts, and lighting inconsistencies within individual frames, while the RNN analyzes motion continuity across multiple frames to identify unnatural transitions, temporal inconsistencies, and desynchronization patterns characteristic of deepfake videos. The anomaly detection module continuously refines its detection algorithms using machine learning, improving its ability to identify emerging forms of video forgery.

Once the video has been analyzed for authenticity, the blockchain node records the authentication metadata, including the cryptographic hash, timestamp, watermark validation data, and encryption verification details, in the blockchain ledger (218). The system then enables third-party entities, including content verification services, social media platforms, legal authorities, and enterprise clients, to access authentication metadata through an application programming interface (220). This API facilitates external verification by providing a secure mechanism for retrieving authentication records from the blockchain ledger. To protect user privacy, the verification application uses a zero-knowledge proof engine to enable authentication without exposing the video's original cryptographic hash or raw content (222). This ensures that authentication can be performed without compromising sensitive video data.

For continuous fraud prevention, the system includes a browser plugin that actively scans and verifies video content encountered online (224). The browser plugin automatically checks whether a video matches its stored blockchain authentication record, ensuring that users are protected from manipulated media. If the plugin detects a discrepancy between the video and its blockchain record, it triggers a fraud alert (226). Minor inconsistencies result in a yellow warning indicator, signaling that the video may have undergone slight modifications, while major discrepancies trigger a red fraud alert, potentially initiating an automated content takedown request.

To maintain the integrity of stored video files, the tamper detection module periodically re-scans authenticated videos at predefined intervals (228). This module generates a new cryptographic hash for each stored video and compares it to the original blockchain hash. If any modifications are detected, a decentralized consensus validation mechanism verifies whether the changes were authorized or if they indicate tampering (230). The consensus validation process ensures that no single entity can alter stored authentication records, requiring multiple blockchain nodes to validate any detected changes before they are accepted.

The fingerprinting module generates a cryptographic video fingerprint using perceptual hashing techniques (232). This fingerprint provides a secondary layer of authentication by enabling visually similar versions of the video to be identified even if they have undergone compression, format conversion, or minor edits. The cryptographic fingerprint is then stored in the blockchain ledger for future verification (234). The content traceability module logs all access attempts, modification attempts, and authentication events, creating a fully verifiable history of the video's distribution and security status (236). To further enhance security, the system records geolocation metadata associated with each access event, ensuring that videos are not accessed from unauthorized locations (238).

To monitor unauthorized distribution, the active watermarking module embeds an active watermark into the video (240). This watermark transmits a callback signal to a verification server whenever the video is played on a user device, enabling real-time tracking of video playback events (242). If the video is played on an unverified device, the self-destructing watermark deactivates, triggering an authentication failure and logging the unauthorized attempt in the blockchain ledger (244). This prevents unauthorized redistribution and playback on unapproved platforms.

For user-initiated verification, the mobile verification application enables real-time authentication of video content (246). Users can capture a video using a mobile device, generate a cryptographic hash, and compare it to the blockchain record to verify authenticity. If inconsistencies are detected, the fraud detection module automatically issues a fraud alert to registered content owners, platform administrators, or security teams (248). The system further enhances security by synchronizing authentication metadata across multiple blockchain networks using a multi-chain interoperability protocol (250). This ensures redundancy, prevents data loss, and enables cross-platform verification.

The hierarchical data classification engine categorizes authentication metadata in the blockchain ledger based on security level, content type, ownership details, and timestamp (252). The adaptive watermarking system dynamically adjusts the opacity and placement of the watermark based on scene complexity, optimizing visibility while maintaining security (254). The anomaly detection module further incorporates generative adversarial networks (GANs) to generate synthetic deepfake forgeries and compare them against the video being authenticated to detect inconsistencies (256).

The system assigns a reputation-based trust score to each video based on authentication history, blockchain consensus validation, and third-party verification attempts (258). The browser plugin uses a machine-learning-based risk assessment engine to adjust alert sensitivity based on user behavior and historical interactions with potentially fraudulent content (260). The mobile verification application includes an augmented reality interface that overlays blockchain authentication metadata as a real-time visual annotation when users view the video through a mobile camera (262). The fraud detection module employs a predictive threat analysis engine that analyzes historical fraud patterns and blockchain access logs to identify emerging deepfake and manipulation techniques before they become widespread (264).

The video authentication process concludes when all verification, fraud detection, and authentication steps have been completed (266). The system ensures that every authenticated video remains protected from tampering, can be verified at any time, and is resistant to manipulation through cryptographic security, AI-driven fraud detection, decentralized consensus validation, and real-time authentication monitoring. This comprehensive multi-layered approach provides an advanced, scalable, and future-proof solution for securing digital video content.

Regarding FIGS. 3A-3D, they collectively represent an exemplary sequence diagram in accordance with one or more embodiments disclosed herein that illustrates the step-by-step interactions between various system components in a blockchain-based video authentication process, including video ingestion, cryptographic hashing, watermark embedding, AI-driven anomaly detection, decentralized blockchain storage, and verification. The diagram further details real-time fraud detection, tamper validation using consensus mechanisms, active watermark monitoring, browser-based authentication, and mobile verification, ensuring video integrity, traceability, and protection against manipulation.

FIG. 3A illustrates a sample portion of the sequence diagram for the video ingestion, processing, and authentication storage within the blockchain-based video authentication system. The process begins when a user device uploads a video file for authentication. The user device serves as the source of the digital video content and transmits the file to the video input module, which acts as the first point of contact for processing and preparing the video for authentication. Upon receiving the uploaded file, the video input module forwards the video to the computing device for processing (300). The computing device is responsible for handling the core authentication procedures, starting with preprocessing the video file (302). During preprocessing, the computing device extracts relevant metadata from the video, such as resolution, frame rate, duration, and encoding format, ensuring that the video is compatible with the authentication workflow.

Once preprocessing is complete, the computing device sends the video file to the hashing module for cryptographic hashing (304). The hashing module applies a secure cryptographic algorithm to the video file to generate a unique cryptographic hash that serves as a tamper-proof fingerprint of the content (306). This cryptographic hash is essential to the authentication process, as any modification to the video, no matter how small, will produce a completely different hash value, making tampering detectable. After generating the cryptographic hash, the hashing module returns the hash to the computing device (308), which then transmits the hash to the blockchain node for recording (310). The blockchain node is responsible for submitting the cryptographic hash to the blockchain ledger to ensure its immutability and verifiability.

The blockchain node submits the cryptographic hash to the blockchain ledger, where it is permanently recorded as an immutable authentication record (312). The blockchain ledger then stores the cryptographic hash in a new block, linking it to the previous block in the chain to create a verifiable and tamper-resistant history of authentication events (314). Once the cryptographic hash is securely stored, the computing device proceeds to enhance the security of the video file through watermarking. The computing device sends the video to the watermarking module for embedding a rotating digital watermark (316). This watermarking process involves embedding a dynamically changing watermark into the video frames, which serves as an additional layer of protection against tampering and unauthorized modifications. The watermarking module generates and embeds the rotating digital watermark within multiple frames of the video (318), ensuring that the watermark cannot be removed or altered without detection.

After embedding the watermark, the watermarking module generates a cryptographic key associated with the watermark and sends it for secure storage (320). The blockchain node receives the watermark cryptographic key and records it in the blockchain ledger alongside the previously stored cryptographic hash (322). This step ensures that the watermark remains verifiable and that its integrity can be checked against the blockchain-stored records. To further enhance security, the system encrypts the watermark metadata before storage. The computing device transmits the watermark metadata to the encryption module for encryption (324). The encryption module applies a hybrid encryption technique that includes both symmetric and asymmetric cryptographic algorithms to ensure that the watermark metadata remains secure from unauthorized access (326).

Once the encryption process is complete, the encryption module returns the encrypted metadata to the computing device (328). The computing device then compiles all relevant authentication metadata, including the cryptographic hash, encrypted watermark data, and verification keys, and sends the authentication metadata for permanent storage (330). The blockchain node submits the authentication metadata to the blockchain ledger, where it is securely recorded alongside the video's cryptographic hash and watermark cryptographic key (332). By integrating cryptographic hashing, blockchain storage, watermark embedding, and encryption, the system ensures that every authenticated video file is protected from tampering, unauthorized modifications, and fraudulent alterations.

Thus, FIG. 3A illustrates the foundation of the blockchain-based video authentication process, detailing how a video file is received, processed, cryptographically hashed, watermarked, encrypted, and stored in the blockchain ledger. This structured approach ensures that video content remains tamper-proof and verifiable throughout its lifecycle, providing a secure and scalable solution for digital video authentication.

FIG. 3B illustrates the portion of the sequence diagram for the video analysis, verification, and tamper detection processes within the blockchain-based video authentication system. The process begins when the computing device transmits the video file to the anomaly detection module for AI-driven analysis (334). The anomaly detection module is responsible for identifying inconsistencies, manipulations, and potential tampering in the video content. To accomplish this, the anomaly detection module processes the video frames using convolutional neural networks (CNNs) and recurrent neural networks (RNNs), both of which are specialized in analyzing spatial and temporal inconsistencies in video data (336). CNNs analyze individual frames for unnatural artifacts, compression distortions, lighting mismatches, and pixel-level anomalies that could indicate synthetic modifications. RNNs evaluate motion continuity across multiple frames to detect unnatural transitions, frame skipping, and inconsistencies in object movement that may suggest digital manipulation.

Once the anomaly detection module completes its analysis, it returns the detection results to the computing device (338). These results contain detailed information about detected anomalies, fraud probability scores, and classifications of potential tampering techniques such as deepfake alterations, frame insertions, or audio desynchronization. The computing device then updates the authentication metadata with the results obtained from the anomaly detection module (340). This metadata is essential for ensuring that every verification request includes not only the original cryptographic hash of the video but also a record of detected anomalies, providing a layered approach to video authentication. The computing device subsequently sends the updated authentication metadata to the blockchain node, which appends the AI-detected anomaly results to the blockchain ledger (342). This ensures that any detected fraud or tampering history is permanently recorded, allowing third-party verifiers to check the integrity of the video at any time.

To facilitate external verification, the verification application submits a request for authentication metadata from the blockchain ledger (344). This request is processed by the blockchain node, which retrieves the authentication metadata stored in the blockchain ledger and returns it to the verification application (346). The verification application then forwards this authentication metadata to authorized entities or systems that need to verify the integrity of the video (348). Since privacy is a critical aspect of authentication, the verification application utilizes a zero-knowledge proof engine to verify the authenticity of the video without revealing the cryptographic hash or any underlying content (350). This process ensures that third-party entities can validate the integrity of the video without direct access to sensitive authentication records, preserving data privacy while still enabling verifiability. Once the verification process is completed, the zero-knowledge proof engine returns the verification result to the verification application (352). This result confirms whether the video is authentic, has been tampered with, or contains any anomalies recorded in the blockchain ledger.

In addition to AI-driven anomaly detection and external verification, FIG. 3B also details the system's tamper detection functionality, which is designed to ensure that authenticated video files remain unchanged over time. The tamper detection module periodically requests a stored copy of the authenticated video from the computing device for validation (364). This periodic revalidation process is crucial in detecting unauthorized modifications that may have occurred after initial authentication. The computing device retrieves the stored video copy and transmits it back to the tamper detection module for analysis (366). The tamper detection module generates a new cryptographic hash of the stored video and compares it to the original hash recorded in the blockchain ledger (368). If the new cryptographic hash does not match the stored hash, it indicates that the video file has been altered.

If any discrepancies are found between the stored cryptographic hash and the newly computed hash, the tamper detection module issues an alert to notify the system that potential tampering has been detected (370). The system does not rely solely on one entity to confirm tampering; instead, the consensus validation mechanism is triggered to verify the tampering results across multiple blockchain nodes (372). This ensures that no single entity can falsely validate or override a tampering alert. If the consensus validation mechanism confirms that tampering has indeed occurred, the system updates the blockchain ledger with validated tampering records (374). These tampering records are stored immutably within the blockchain to provide a transparent and auditable history of detected modifications.

Thus, the sequence diagram of FIG. 3B illustrates a multi-layered approach to video authentication by integrating AI-driven anomaly detection, blockchain-based verification, zero-knowledge proof privacy protection, and tamper detection with consensus-based validation. Each step in this process ensures that video content remains verifiable, secure, and resistant to tampering, providing a highly reliable and scalable authentication framework. By combining AI and blockchain technologies, the system creates a robust solution for detecting deepfake manipulation, preserving content integrity, and ensuring that authenticated video files remain unaltered throughout their lifecycle.

FIG. 3C illustrates the portion of the sequence diagram for real-time verification and fingerprinting of digital video content using a blockchain-based authentication system. The process begins when the browser plugin requests authentication verification for an online video (354). The browser plugin functions as an intermediary between the user's browsing environment and the verification system, ensuring that digital video content displayed in web browsers is authenticated before being consumed. Upon detecting a video, the browser plugin communicates with the verification application and submits a request to verify whether the video has been previously authenticated and stored on the blockchain ledger.

Upon receiving the authentication verification request, the verification application retrieves the corresponding authentication metadata from the blockchain node (356). The verification application is responsible for processing authentication queries and interfacing with the blockchain to ensure that the integrity of the video file can be validated against previously stored records. The blockchain node then processes the request by querying the blockchain ledger for authentication metadata related to the requested video. Once the blockchain node locates the relevant authentication data, it returns the authentication metadata to the verification application (358). The returned metadata contains information such as the cryptographic hash, video fingerprint, watermark cryptographic key, and other security markers previously stored in the blockchain ledger.

After retrieving the authentication metadata, the verification application sends the verification results back to the browser plugin (360). The verification results contain details on whether the video matches the stored cryptographic hash and whether any modifications or inconsistencies have been detected. The browser plugin then analyzes the verification results and determines whether the video content is authentic or has been altered. If the verification results indicate that the video does not match the original authentication record, the browser plugin triggers a fraud alert (362). The fraud alert notifies the user that the video may have been modified or tampered with, allowing the user to make an informed decision about the authenticity of the content. The fraud alert may also trigger an automated security action, such as restricting access to the video or notifying platform administrators about the detected inconsistency.

Parallel to the browser plugin verification, the mobile verification application enables users to authenticate videos using their mobile devices. The mobile verification application requests authentication for a scanned video (398). This functionality allows users to capture or upload a video and verify its authenticity in real time. Upon receiving the request, the verification application retrieves the corresponding authentication metadata from the blockchain node (400). The blockchain node processes the request and returns the authentication metadata to the mobile verification application (402). The mobile verification application then compares the cryptographic hash of the scanned video with the hash stored in the blockchain ledger (404). Since the cryptographic hash serves as a unique fingerprint of the video file, any modifications to the video will result in a hash mismatch.

If discrepancies are detected between the scanned video's cryptographic hash and the stored hash, the mobile verification application alerts the user (406). This alert informs the user that the scanned video does not match the originally authenticated version, indicating possible tampering, editing, or unauthorized modifications. The alert may also include details on the specific inconsistencies detected, helping users assess the authenticity of the video content before relying on it for critical decisions.

In addition to cryptographic hash-based verification, the system also employs a fingerprinting module to generate perceptual hashes for videos. The computing device sends the video to the fingerprinting module to generate a cryptographic fingerprint (376). The fingerprinting module applies perceptual hashing techniques to create a unique digital signature for the video file. Unlike standard cryptographic hashes, perceptual hashes allow the system to identify visually similar or slightly modified versions of the video, even if minor edits, format changes, or compression have been applied.

Once the fingerprinting module generates the perceptual hash-based video fingerprint, it returns the fingerprint to the computing device (378). The computing device then stores the video fingerprint in the blockchain ledger via the blockchain node (380). The blockchain ledger records the video fingerprint for future verification (382). By storing perceptual fingerprints alongside cryptographic hashes, the system ensures that even slightly altered versions of a video can be detected and traced back to their original authenticated versions.

Thus, FIG. 3C illustrates a critical component of the blockchain-based video authentication system by integrating real-time verification, fraud detection, cryptographic hash comparison, and perceptual fingerprinting. The browser plugin ensures that online videos are authenticated before being consumed, while the mobile verification application provides users with the ability to verify the authenticity of videos captured through mobile devices. The fingerprinting module enhances the system's ability to detect modified versions of authenticated videos, ensuring that even visually similar videos can be traced and validated. By combining cryptographic security with perceptual analysis and blockchain immutability, the system establishes a comprehensive framework for video authentication, fraud prevention, and real-time verification.

FIG. 3D illustrates the portion of the sequence diagram for content traceability, active monitoring, and fraud detection within the blockchain-based video authentication system. The process begins when the content traceability module requests access logs and modification history from the blockchain ledger (384). The content traceability module plays a crucial role in tracking all events associated with a video, including authentication history, access attempts, modifications, and verification requests. By querying the blockchain ledger, the module retrieves a complete record of all interactions with the video, ensuring full transparency in content management. Upon receiving the request, the blockchain node processes the query and retrieves the access logs and modification history stored in the immutable ledger. The blockchain node then returns the requested information to the content traceability module (386), allowing the system to analyze past authentication events and detect any unauthorized changes or suspicious activity.

Once content traceability is established, the system proceeds with active monitoring through the active watermarking module. The active watermarking module embeds an active watermark into the video file to enable real-time tracking and playback validation (388). Unlike static watermarks, which remain fixed within the video, an active watermark is dynamically embedded at multiple intervals, ensuring that playback authenticity can be verified throughout the duration of the video. After embedding the watermark, the active watermarking module generates watermark tracking metadata and sends this data to the blockchain node for secure storage (390). The watermark tracking metadata contains critical information, including timestamps, encryption keys, and device authentication details, ensuring that the system can validate playback events against stored authentication records.

When a user plays the video, the active watermarking module transmits a callback signal to the verification application (392). This callback signal acts as a real-time authentication check, confirming whether the video playback originates from an authorized device. The verification application then processes the callback signal and cross-references the playback device with the blockchain-stored authentication data to determine if the device is authorized (394). If the playback device is not verified, the verification application triggers an authentication failure, preventing unauthorized playback of the video (396). This process ensures that only authorized users can access and view the content, preventing piracy, unauthorized redistribution, and unauthorized streaming of protected videos.

Parallel to active monitoring, the fraud detection module continuously analyzes anomaly reports generated by the anomaly detection system (408). The fraud detection module is responsible for identifying patterns of suspicious activity, deepfake manipulation, or other fraudulent attempts to alter authenticated video content. By continuously monitoring anomaly detection reports, the fraud detection module assesses risks associated with video integrity and potential unauthorized modifications. Upon detecting fraudulent activity, the fraud detection module issues fraud alerts to content owners, platform administrators, and security teams (410). These alerts contain detailed information about the nature of the detected anomaly, the type of manipulation detected, and the risk assessment associated with the fraudulent activity.

To further enhance security, the predictive threat analysis engine evaluates historical fraud patterns, blockchain activity logs, and AI-detected anomalies to identify emerging threats (412). The predictive threat analysis engine applies machine learning algorithms to detect new and evolving deepfake manipulation techniques, ensuring that the authentication system remains adaptive and resilient against emerging threats. Based on the analysis, the predictive threat analysis engine updates the fraud detection module with risk assessments and recommended countermeasures (414). If the system detects high-risk fraudulent activity, the fraud detection module initiates automated mitigation actions to protect the integrity of the video content (416). These mitigation actions may include restricting access to the video, blocking suspicious playback attempts, notifying relevant authorities, or disabling authentication keys associated with potentially compromised video files.

Finally, the system completes the authentication and verification process by recording the final verification logs in the blockchain ledger (418). These verification logs ensure that every authentication event, anomaly detection result, fraud alert, and playback validation attempt is permanently stored in the blockchain. The immutable nature of the blockchain ledger guarantees that the authentication records remain tamper-proof, allowing future audits and forensic investigations to trace the complete history of each video file. This structured approach ensures that video content remains verifiable, traceable, and protected against unauthorized modifications throughout its lifecycle.

Thus, FIG. 3D demonstrates how the blockchain-based video authentication system integrates content traceability, active watermarking, real-time fraud detection, and predictive threat analysis to create a secure and transparent authentication framework. By leveraging blockchain storage, AI-driven fraud detection, and active watermark tracking, the system ensures that video content remains resistant to tampering, unauthorized distribution, and manipulation. The combination of fraud detection and predictive threat analysis allows the system to proactively identify and mitigate emerging threats, providing a scalable and future-proof solution for video authentication in a digital environment.

FIG. 4 illustrates an exemplary class diagram that defines a sample object-oriented architecture of the blockchain-based video authentication system. The class diagram can include multiple interconnected classes, each responsible for a specific functional component of the system. Each class encapsulates attributes and methods that define its behavior and interaction with other classes, ensuring modularity, scalability, and security in the video authentication process. The relationships between the classes enforce a structured approach to video ingestion, cryptographic security, artificial intelligence-driven anomaly detection, blockchain-based verification, and real-time fraud prevention. The class diagram follows a hierarchical organization where fundamental entities, such as video files, interact with cryptographic processing, encryption, blockchain storage, AI-based detection, and external verification components to provide a robust and tamper-resistant authentication mechanism.

The Video File (500) class represents the core entity that the system processes. It contains attributes such as file name, file size, video format, resolution, frame rate, duration, bit rate, creation date, modification date, and content owner. These attributes store metadata about the video file, ensuring that each video submitted for authentication is uniquely identified. The methods in this class include upload video, retrieve video, extract frames, and preprocess video. The upload video method allows users to submit a video for authentication, while the retrieve video method enables the system to access stored video files. The extract frames method is responsible for generating keyframes for analysis, and the preprocess video method standardizes the video format for cryptographic processing. The Video File (500) class interacts directly with the Hashing Module (502) and Watermarking Module (508) to initiate the authentication workflow.

The Hashing Module (502) class is responsible for generating a cryptographic hash of the video file. It includes attributes such as hash algorithm type, hash value, timestamp, and verification status. The compute hash method applies a secure hashing algorithm to the video file, producing a unique digital fingerprint that can be used for integrity verification. The compare hash method verifies whether a newly computed hash matches a previously stored hash, ensuring that the video file has not been altered. The verify integrity method performs an additional layer of validation by cross-referencing the hash with the blockchain ledger. This class interacts with the Blockchain Node (504) class to transmit the computed hash for decentralized storage.

The Blockchain Node (504) class facilitates communication between the hashing module and the Blockchain Ledger (506). It has attributes such as node identifier, blockchain address, consensus status, and network peers. The transmit hash method sends a generated video hash to the blockchain for recording. The retrieve hash method allows the system to request an existing hash from the blockchain for verification. The append block method creates a new blockchain block containing the hash and associated metadata, while the validate transaction method confirms that new data entries are legitimate. This class interacts with the Blockchain Ledger (506) to ensure that authentication records are immutably stored.

The Blockchain Ledger (506) class represents the distributed ledger that stores authentication records. Its attributes include block identifier, previous block hash, transaction history, timestamp, and cryptographic signature. The store authentication record method ensures that each video hash is permanently recorded on the blockchain. The validate block method applies consensus mechanisms to confirm the authenticity of new blocks before they are added to the chain. The retrieve metadata method allows external verification systems to fetch authentication data. The synchronize blockchain method ensures that multiple nodes remain synchronized, preventing inconsistencies in authentication records.

The Watermarking Module (508) class is responsible for embedding and verifying digital watermarks in the video file. It includes attributes such as watermark type, encryption key, rotation interval, and watermark status. The generate watermark method creates a dynamically changing watermark for the video, while the embed watermark method integrates the watermark into multiple frames of the video file. The extract watermark method retrieves the watermark for validation, and the validate watermark method ensures that the watermark has not been tampered with. The Watermarking Module (508) class interacts with the Encryption Module (510) to protect watermark metadata before storage.

The Encryption Module (510) class encrypts authentication data to prevent unauthorized access. It includes attributes such as encryption algorithm, key length, encryption status, and decryption key. The encrypt metadata method applies quantum-resistant encryption techniques to authentication records. The decrypt metadata method allows authorized users to retrieve encrypted records when needed. The generate key method generates a secure cryptographic key for encryption, while the validate encryption method ensures that stored authentication records remain encrypted and untampered. This class interacts with the Blockchain Ledger (506) to store encrypted authentication data.

The Anomaly Detection Module (512) class is responsible for analyzing video frames to detect tampering or deepfake manipulation. Its attributes include AI model type, confidence score, detection threshold, and training dataset. The analyze frames method applies convolutional neural networks to identify spatial inconsistencies in video frames. The detect anomalies method leverages recurrent neural networks to evaluate sequential motion patterns for signs of synthetic alterations. The compare motion patterns method checks for unnatural transitions between frames, while the generate report method logs anomaly detection results. The Anomaly Detection Module (512) class interacts with the Verification Application (514) to provide analysis results.

The Verification Application (514) class facilitates third-party verification of video authenticity. It includes attributes such as verification request ID, response status, authentication score, and access control. The request verification method allows external platforms to request verification of a video file. The fetch authentication record method retrieves authentication data from the blockchain. The validate video method compares a submitted video to its stored blockchain record, and the return verification result method provides feedback on whether the video is authentic or tampered with. This class communicates with the Zero Knowledge Proof Engine (516) to ensure privacy-preserving verification.

The Zero Knowledge Proof Engine (516) class enables authentication verification without exposing cryptographic hashes. It contains attributes such as proof request ID, cryptographic proof, verification outcome, and proof expiration. The generate proof method creates a zero-knowledge proof that validates a video's authenticity. The validate proof method ensures that a verification request meets security requirements. The verify without exposure method confirms authentication results without revealing sensitive information. The return proof result method sends verification results to the Verification Application (514).

The Browser Plugin (518) class enables real-time fraud detection for videos viewed in web browsers. Its attributes include plugin version, scan frequency, detection threshold, and fraud alert level. The monitor video method scans video content for inconsistencies. The request verification method queries the verification application for authentication data. The trigger alert method generates warnings for suspicious videos, and the notify user method informs viewers of potential fraud.

The Tamper Detection Module (520) class periodically checks stored video files for unauthorized modifications. Its attributes include detection interval, tamper flag, validation history, and consensus status. The rehash video method generates a new cryptographic hash to compare with the original. The compare stored hash method verifies consistency with blockchain records. The log modifications method records changes, while the alert security method notifies administrators of detected tampering.

The Consensus Validation Mechanism (522) class ensures decentralized validation of tamper detection results. It contains attributes such as consensus algorithm, participating nodes, quorum threshold, and validation status. The initiate consensus method starts a distributed verification process. The verify tampering method determines whether detected changes are legitimate. The confirm authenticity method approves or denies tampering claims, and the update blockchain method records validation results.

The Fingerprinting Module (524) class generates perceptual hashes for identifying visually similar videos. Its attributes include fingerprint ID, hash precision, similarity threshold, and stored fingerprint database. The generate fingerprint method computes a unique fingerprint for a video. The match fingerprint method checks for similar videos. The detect similar videos method flags near-duplicate content, and the update fingerprint database method maintains records.

The Active Watermarking Module (526) class embeds an active watermark that transmits a signal when a video is played. Its attributes include tracking ID, device authentication, playback event log, and callback verification. The embed active watermark method integrates the tracking watermark. The detect playback method monitors when and where the video is accessed. The transmit signal method sends playback events to the verification application, while the validate playback device method confirms whether the device is authorized.

The Fraud Detection Module (528) class continuously monitors the system for suspicious activities. Its attributes include fraud case ID, risk level, detection model, and fraud score. The detect fraud method scans for suspicious patterns. The analyze patterns method identifies trends in manipulation. The flag suspicious activity method raises fraud alerts, and the generate fraud report method provides analysis.

The Predictive Threat Analysis Engine (530) class evaluates emerging video manipulation threats using AI. Its attributes include historical fraud database, machine learning model, risk assessment score, and predictive algorithm. The analyze fraud trends method reviews past fraud attempts. The detect emerging threats method identifies new risks. The update risk models method adapts detection algorithms, while the notify security teams method alerts stakeholders.

The class diagram in FIG. 4 provides a structured and scalable model for the blockchain-based video authentication system, ensuring modularity, security, and interoperability across authentication, verification, fraud detection, and forensic analysis processes.

Pseudocode exemplars for implementing various aspects of this disclosure are set forth below with explanations for reference.

```
# Import necessary libraries for cryptographic hashing, encryption, AI models, and blockchain interactions
import hashlib
import random
import time
from blockchain_sdk import BlockchainLedger
from ai_models import CNN_RNN_AnomalyDetector, PredictiveRiskModel
from encryption_module import QuantumResistantEncryption
from watermarking_system import WatermarkingEngine
from video_processing import VideoProcessingEngine
from geo_tracking import GeoLocationTracker
from browser_verification import BrowserPlugin
from decentralized_verification import MultiChainValidator
# Define a global configuration object
```

```
CONFIG = {
    "encryption_key": "SecureQuantumKey123",
    "blockchain_nodes": ["Node1", "Node2", "Node3"],
    "consensus_threshold": 3,
    "fraud_alert_threshold": 0.7,
    "risk_prediction_threshold": 0.8
}
# Initialize core system modules
class VideoInputModule:
    def_init_(self):
        self.video_queue = [ ]
    def ingest_video(self, video_file, user_id):
        video_id = self.generate_unique_video_id(video_file)
        metadata = {
            "video_id": video_id,
            "user_id": user_id,
            "timestamp": time.time( ),
            "status": "Pending"
        }
        self.video_queue.append(metadata)
        return video_id
    def generate_unique_video_id(self, video_file):
        return hashlib.sha256(video_file.encode( )).hexdigest( )[:16]
class HashingModule:
    def_init_(self):
        pass
    def generate_hash(self, video_file):
       return hashlib.sha256(video_file.encode( )).hexdigest( )
    def verify_hash(self, original_hash, computed_hash):
        return original_hash == computed_hash
class WatermarkingModule:
    def_init_(self):
        self.engine = WatermarkingEngine( )
    def embed_watermark(self, video_file, watermark_data):
        return self.engine.apply_watermark(video_file, watermark_data)
    def extract_watermark(self, video_file):
        return self.engine.detect_watermark(video_file)
class EncryptionModule:
    def _init_(self):
        self.encryptor = QuantumResistantEncryption( )
    def encrypt_data(self, data):
        return self.encryptor.hybrid_encrypt(data, CONFIG["encryption_key"])
    def decrypt_data(self, encrypted_data):
        return                    self.encryptor.hybrid_decrypt(encrypted_data,
CONFIG["encryption_key"])
class FraudDetectionModule:
    def _init_(self):
        self.anomaly_detector = CNN_RNN_AnomalyDetector( )
    def analyze_video(self, video_file):
        fraud_score = self.anomaly_detector.detect_anomalies(video_file)
        return fraud_score > CONFIG["fraud_alert_threshold"]
```

-continued

```
class BlockchainVerificationModule:
    def_init_(self):
        self.ledger = BlockchainLedger(CONFIG["blockchain_nodes"])
    def store_video_hash(self, video_id, hash_value, metadata):
        self.ledger.store(video_id, hash_value, metadata)
    def verify_video(self, video_id, video_file):
        computed_hash = HashingModule( ).generate_hash(video_file)
        return self.ledger.verify(video_id, computed_hash)
class MultiChainInteroperability:
    def_init_(self, chains):
        self.chains = chains
    def cross_chain_verification(self, video_id):
        consensus = sum(chain.verify(video_id) for chain in self.chains)
        return consensus >= CONFIG["consensus_threshold"]
class PredictiveThreatAnalysis:
    def_init_(self):
        self.risk_model = PredictiveRiskModel( )
    def predict_risks(self, video_metadata):
        risk_score = self.risk_model.assess_risk(video_metadata)
        return risk_score > CONFIG["risk_prediction_threshold"]
class BrowserVerificationPlugin:
    def_init_(self):
        self.plugin = BrowserPlugin( )
    def verify_online_video(self, video_url):
        return self.plugin.verify_video(video_url)
class VideoProcessingModule:
    def_init_(self):
        self.processor = VideoProcessingEngine( )
    def preprocess_video(self, video_file):
        return self.processor.format_video(video_file)
    def extract_frames(self, video_file):
        return self.processor.get_frames(video_file)
# Main Authentication Workflow
def authenticate_video(video_file, user_id):
    video_input = VideoInputModule( )
    hashing_module = HashingModule( )
    watermarking_module = WatermarkingModule( )
    encryption_module = EncryptionModule( )
    fraud_detection = FraudDetectionModule( )
    blockchain_module = BlockchainVerificationModule( )
    multi_chain = MultiChainInteroperability([BlockchainLedger( ), BlockchainLedger( )])
    predictive_engine = PredictiveThreatAnalysis( )
    browser_verifier = BrowserVerificationPlugin( )
    video_processor = VideoProcessingModule( )
    # Step 1: Ingest video
    video_id = video_input.ingest_video(video_file, user_id)
    # Step 2: Preprocess video and generate hash
    formatted_video = video_processor.preprocess_video(video_file)
    video_hash = hashing_module.generate_hash(formatted_video)
    # Step 3: Embed watermark
    watermark_data = f"Auth-{video_id}-{time.time( )}"
    watermarked_video
watermarking_module.embed_watermark(formatted_video, watermark_data)
    # Step 4: Encrypt metadata
    metadata = {"user_id, "timestamp": time.time( ), "watermark":
watermark_data}
    encrypted_metadata = encryption_module.encrypt_data(metadata)
    # Step 5: Store video hash in blockchain
    blockchain_module.store_video_hash(video_id, video_hash, encrypted_metadata)
    # Step 6: Check for fraud detection
    is_fraudulent = fraud_detection.analyze_video(watermarked_video)
    # Step 7: Verify video authenticity
    is_valid = blockchain_module.verify_video(video_id, watermarked_video)
    # Step 8: Perform cross-chain verification
    is_verified_across_chains = multi_chain.cross_chain_verification(video_id)
    # Step 9: Predict risks
    risk_score = predictive_engine.predict_risks(metadata)
    # Step 10: Verify online video authenticity (if applicable)
    is_online_valid = browser_verifier.verify_online_video(video_file)
    # Step 11: Display results
    print(f"Video ID: {video_id}")
    print(f"Verification: {'Valid' if is_valid else 'Invalid'}")
    print(f"Cross-chain Verification: {'Verified' if is_verified_across_chains else 'Not
Verified'}")
    print(f"Fraud Alert: {'Yes' if is_fraudulent else 'No'}")
    print(f"Risk Score: {risk_score}")
    print(f"Online Verification: {'Valid' if is_online_valid else 'Invalid'}")
    # Step 12: Return result
    return {
```

-continued

```
        "video_id": video_id,
        "verification_status": is_valid,
        "fraud_alert": is_fraudulent,
        "risk_score": risk_score,
        "multi_chain_verified": is_verified_across_chains,
        "online_verification": is_online_valid
    }
# Execute authentication for a sample video
if_name_ == "_main _":
    sample_video = "test_video.mp4"
    user_id = "user_001"
    results = authenticate_video(sample_video, user_id)
```

The pseudocode implements a comprehensive blockchain-based video authentication system that ensures digital video content remains verifiable, tamper-resistant, and secure against fraudulent alterations. The system incorporates various modules, including video ingestion, cryptographic hashing, blockchain-based verification, fraud detection, multi-chain interoperability, and AI-driven threat analysis. Each component works together to authenticate videos, detect anomalies, and prevent unauthorized modifications using advanced cryptographic and artificial intelligence techniques. The system begins with the VideoInputModule, which is responsible for ingesting video files submitted for authentication. When a user uploads a video, the module assigns it a unique identifier by hashing the file contents using a SHA-256 hashing function. This identifier serves as a reference throughout the verification process. The video, along with its associated metadata, is then placed in a processing queue, awaiting further validation. The metadata includes information such as the user ID, timestamp of submission, and initial verification status. The unique identifier ensures that each video remains distinguishable, preventing duplication or conflicts in the blockchain storage.

Once the video is ingested, the HashingModule generates a cryptographic hash of the video file. This module uses a secure cryptographic hashing algorithm, such as SHA-256, to create a unique fingerprint of the video content. The generated hash is then used in later stages to verify the integrity of the video by comparing stored hashes in the blockchain ledger with the computed hash of the video at any given time. If the computed hash deviates from the recorded hash, it indicates that the video has been altered, and the authentication process fails.

The system also incorporates a WatermarkingModule, which embeds a rotating digital watermark into multiple frames of the video file. This module uses an advanced watermarking engine to apply a tamper-resistant identifier that changes dynamically over time. The watermark ensures that any unauthorized modifications to the video will be detectable upon playback. The module also includes a function for extracting the watermark from a video file to confirm its authenticity. If an extracted watermark does not match the expected pattern, the system flags the video as potentially manipulated.

To protect authentication metadata and the embedded watermarking information, the EncryptionModule applies a hybrid quantum-resistant encryption technique. This module employs a combination of symmetric and asymmetric encryption methods, including AES-256 for fast encryption of metadata and post-quantum cryptographic techniques such as CRYSTALS-Kyber or NTRUEncrypt for secure key exchange. By implementing hybrid encryption, the system ensures that authentication metadata remains protected against both classical and quantum-based attacks. The encryption module also provides decryption functions that allow authorized entities to retrieve and verify stored metadata securely.

The FraudDetectionModule is responsible for analyzing video files to detect signs of manipulation, forgery, or deepfake alterations. This module utilizes an anomaly detection model based on convolutional and recurrent neural networks. The convolutional neural network (CNN) analyzes video frames for pixel-level inconsistencies that indicate tampering, such as unnatural lighting, compression artifacts, or distortions. Meanwhile, the recurrent neural network (RNN) examines temporal inconsistencies by evaluating motion continuity across frames. The fraud detection module assigns a fraud score based on the detected anomalies, and if the score exceeds a predefined threshold, the system flags the video as fraudulent and issues an alert.

The BlockchainVerificationModule handles the process of storing cryptographic hashes and verifying videos against recorded blockchain data. It interacts with the blockchain ledger to store the computed hash of each video, along with encrypted metadata, ensuring an immutable and tamper-resistant authentication record. When a verification request is made, the module retrieves the stored hash and compares it with the hash of the newly submitted video. If the hashes match, the video is considered authentic; otherwise, the system flags it as potentially altered. This module relies on distributed ledger technology, preventing unauthorized alterations and ensuring a permanent record of authentication.

To ensure cross-chain compatibility, the MultiChainInteroperability module enables video authentication records to be verified across multiple blockchain networks. This module interacts with different blockchain infrastructures and performs consensus-based validation. The system queries multiple blockchain nodes to determine if a video ID has been authenticated on any of them. If a majority consensus is reached among the blockchain networks, the video is considered verified across chains. This functionality enhances security by ensuring that authentication data remains decentralized and resistant to single-network failures.

The system also includes a PredictiveThreatAnalysis engine that continuously evaluates risk factors associated with video authentication attempts. This module applies machine learning algorithms to predict the likelihood of fraud based on metadata, anomaly detection results, and historical authentication records. The risk assessment model assigns a threat score to each video based on its probability of being manipulated. If the risk score surpasses a predetermined threshold, the system increases security measures, such as requiring additional verification steps or notifying content moderators.

For real-time video authentication on web-based platforms, the BrowserVerificationPlugin provides an automated way to verify videos played within a web browser. When a user accesses a video online, the browser plugin retrieves authentication metadata from the blockchain ledger and compares it with the video's computed hash. If the verification succeeds, the plugin displays a confirmation message; otherwise, it issues an alert indicating potential manipulation. This module enhances digital security by enabling users to verify video authenticity without requiring additional software.

The VideoProcessingModule prepares video files for authentication by standardizing their format and extracting key frames for analysis. This module ensures that videos submitted in different formats are processed uniformly, enabling accurate comparison against stored authentication records. It also facilitates forensic analysis by extracting frames that exhibit signs of tampering, helping AI models detect anomalies more effectively.

The main authentication workflow integrates all these components into a structured process. When a video is submitted, the system first ingests the file and assigns it a unique ID. The video undergoes preprocessing, where its format is standardized, and frames are extracted for analysis. The system generates a cryptographic hash of the video and stores it in the blockchain ledger alongside encrypted metadata. A digital watermark is embedded to further secure the content. The video then passes through the fraud detection module, where AI-based anomaly detection evaluates its authenticity. The system verifies the video against blockchain records and performs cross-chain validation. If fraud is detected or the authentication fails, the system issues an alert and prevents unauthorized distribution. Additionally, the predictive threat analysis engine assesses the risk level of the video based on prior fraud patterns. The final verification result is displayed to the user, along with fraud alerts, risk scores, and blockchain verification status.

By implementing these and/or other modules in a structured manner, the system achieves a robust and scalable framework for video authentication. The hybrid quantum-resistant encryption protects authentication metadata from emerging quantum threats. The AI-driven fraud detection module provides an adaptive defense against deepfake manipulation, ensuring real-time anomaly detection. The multi-chain interoperability protocol allows authentication records to be verified across different blockchain infrastructures, enhancing reliability and decentralization. The predictive threat analysis engine enables proactive fraud prevention by assessing risk patterns and adjusting security measures accordingly. The integration of browser-based verification ensures that online users can authenticate video content seamlessly, preventing the spread of misinformation and forged digital media. This system collectively establishes a highly secure, tamper-resistant, and future-proof method for video authentication, ensuring that digital content remains trustworthy and verifiable in an increasingly AI-driven digital landscape.

A skilled artisan, upon reviewing the disclosure, will appreciate that there are numerous alternatives, modifications, combinations, and customizations that can be applied to the systems and methods described herein while remaining within the spirit and scope of the disclosure. One alternative involves modifying the blockchain implementation to utilize a different type of distributed ledger technology such as Directed Acyclic Graph (DAG)-based ledgers instead of traditional blockchain networks. This alternative could improve transaction efficiency, reduce latency, and increase scalability, particularly for real-time verification applications. Another modification includes using a permissioned blockchain instead of a public blockchain for scenarios where controlled access is necessary, such as corporate environments where only authorized participants should verify video authenticity.

An alternative approach to cryptographic hashing could involve using a more advanced post-quantum cryptographic hash function such as SHA-3 or BLAKE3 in place of SHA-256. This change could enhance security by ensuring resistance against quantum computing attacks while maintaining efficient processing speeds. Another customization could involve implementing a multi-hashing approach where multiple hashing algorithms are applied to each video file, creating redundancy that strengthens integrity verification. A variation of this method could use Merkle trees to structure cryptographic hashes, enabling more efficient partial verifications and reducing the computational burden for large-scale authentication checks.

The watermarking module can also be customized by employing different types of watermarking techniques based on the intended use case. For instance, instead of using a single static or rotating watermark, a hybrid approach could combine frequency-domain watermarking, such as discrete cosine transform-based watermarking, with spatial-domain watermarking to create an even more tamper-resistant watermarking scheme. Additionally, the active watermarking system could be modified to use blockchain smart contracts to automatically revoke access to a video when unauthorized alterations are detected. A further customization would be to integrate biometric watermarking techniques that link video verification to specific content creators by embedding facial recognition-based authentication signatures into the watermark.

The fraud detection module could be enhanced by incorporating additional artificial intelligence models such as transformer-based networks like Vision Transformers (ViTs) or Generative Adversarial Network (GAN) detection models that continuously adapt to new forgery techniques. This module could also be expanded to include federated learning, allowing multiple distributed AI models to collaboratively improve fraud detection accuracy without sharing sensitive training data. Another modification involves integrating additional metadata sources, such as device telemetry, user behavior analytics, or external forensic databases, to improve anomaly detection and identify high-risk authentication events more effectively.

The encryption module can be customized to support multiple layers of security by implementing additional hybrid encryption techniques that combine symmetric, asymmetric, and homomorphic encryption. One possible modification would be to use Fully Homomorphic Encryption (FHE) for processing authentication data without decrypting it, ensuring that video metadata remains encrypted even during analysis. Another potential enhancement involves using Secure Multi-Party Computation (SMPC) to distribute the encryption process across multiple independent parties, eliminating the risk of a single point of failure in cryptographic security.

The multi-chain interoperability module can be modified to support additional blockchain networks through cross-chain communication protocols such as Atomic Swaps or Interledger Protocol (ILP), allowing verification data to be seamlessly transferred and authenticated across different blockchain ecosystems. Another customization could involve integrating blockchain oracles, such as Chainlink or Band Protocol, to fetch real-world verification data and enhance authentication through external data sources. Additionally, private and hybrid blockchain configurations could be implemented to provide varying degrees of data access while maintaining decentralization.

The browser verification plugin could be extended to support integration with social media platforms, enabling real-time authentication of videos uploaded or streamed on popular content-sharing platforms. This extension could be customized to function as an API that third-party developers can embed into their platforms, allowing video verification results to be displayed alongside media content. A further enhancement would be implementing blockchain-backed content credentials that provide a tamper-proof history of a video's verification status, allowing users to track the entire authentication lifecycle of a video file.

The predictive threat analysis engine could be modified to incorporate additional sources of intelligence, such as crowdsourced fraud detection reports or government-issued digital verification registries. This customization would allow the system to continuously refine its fraud detection capabilities by learning from new attack patterns and fraudulent video manipulation attempts reported in real-world environments. Another modification could involve integrating automated response mechanisms, such as dynamically adjusting verification thresholds, issuing real-time fraud alerts to content moderators, or triggering blockchain smart contracts that restrict access to flagged content.

The system can also be combined with digital rights management (DRM) solutions to provide a complete framework for both authentication and content protection. By integrating DRM-based access controls, the system could ensure that only verified users with the correct authentication credentials can view or modify a video file. Additionally, this combination could allow for automated licensing enforcement, where access to a video is dynamically granted or revoked based on its verification status and ownership credentials stored on the blockchain.

The mobile verification application could be expanded to include additional authentication methods such as Near-Field Communication (NFC) verification, allowing users to authenticate video content by tapping their mobile devices on NFC-enabled tags embedded within storage media. Another customization would be to use decentralized identity verification, where users authenticate their credentials using self-sovereign identity frameworks based on blockchain-based identity standards such as Decentralized Identifiers (DIDs). This approach would ensure privacy-preserving authentication, allowing users to prove video authenticity without exposing personally identifiable information.

The system can also be modified to support offline verification capabilities, enabling users to authenticate video files without requiring an internet connection. This modification could involve storing cryptographic authentication records locally on user devices and synchronizing them with the blockchain ledger once connectivity is restored. Another enhancement would be to implement a lightweight verification mode that allows resource-constrained devices, such as IoT-based video recorders or embedded systems, to verify video authenticity using simplified cryptographic proof mechanisms such as Zero-Knowledge Proofs (ZKPs).

Another possible combination involves integrating the system with law enforcement and forensic investigation tools, allowing government agencies to authenticate video evidence stored on the blockchain. This integration could include forensic watermark tracking, where video files contain hidden identifiers that allow investigators to trace the origin and modification history of video evidence. Additionally, the system could integrate with AI-driven forensic analysis tools that use machine learning to reconstruct original video frames from tampered content, providing further insights into manipulation attempts.

The system architecture can be modified to use a distributed file storage solution such as the InterPlanetary File System (IPFS) or Arweave to store encrypted video files while maintaining blockchain verification records separately. This alternative allows for scalable, decentralized storage without overwhelming blockchain networks with large video file sizes. Another modification involves implementing a hybrid storage solution that stores verification metadata on-chain while keeping full video files off-chain to balance security and efficiency.

To improve scalability and efficiency, the system can be further customized by introducing Layer 2 blockchain solutions such as zk-Rollups or Optimistic Rollups. These solutions would allow multiple verification transactions to be batched together, reducing transaction costs and increasing throughput. Another optimization could involve using sharding-based blockchain networks, such as Ethereum 2.0's shard chains, to distribute authentication workloads across multiple sub-networks for enhanced performance.

The fraud alert system could be enhanced by integrating real-time anomaly detection alerts into messaging applications, allowing verified users to receive immediate notifications whenever a fraudulent video is detected. A further customization would be enabling automated reporting to social media moderation teams, triggering immediate review processes when video manipulations are flagged by the authentication system.

All of these alternatives, modifications, combinations, and customizations can be incorporated into the system while maintaining its core functionality of securing video content through blockchain-based authentication, AI-driven fraud detection, and multi-layered cryptographic protection. The flexibility of the system architecture allows for continual enhancements as new threats emerge, ensuring that digital video authentication remains effective and adaptable in evolving technological landscapes.

These alternatives, modifications, combinations, and customizations demonstrate the flexibility and broad applicability of the system, ensuring that it can be adapted, expanded, and optimized to address evolving security challenges, industry-specific needs, and technological advancements while remaining within the spirit and scope of the disclosure.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for authenticating digital video content using a blockchain-based system, the method comprising: receiving, by a computing device, a video file to be authenticated; generating, by a hashing module of the computing device, a cryptographic hash of the video file to produce a unique video hash; storing, by a blockchain node, the unique video hash on a blockchain ledger as an immutable authentication record by appending the unique video hash to a new block and linking the new block to a previously stored block in the blockchain ledger; embedding, by a watermarking module of the computing device, a rotating digital watermark into a plurality of frames of the video file, wherein the rotating digital watermark dynamically changes over time within the video file to prevent removal or forgery; applying, by an encryption module of the computing device, a quantum-resistant encryption algorithm to encrypt the rotating digital watermark and the authentication record stored in the blockchain ledger; analyzing, by an anomaly detection module of the computing device, the plurality of frames of the video file using an artificial intelligence model trained to detect inconsistencies in facial movements, frame transitions, and other visual anomalies indicative of tampering or synthetic media generation; storing, by the blockchain node, an authentication metadata record associated with the video file on the blockchain ledger, the authentication metadata record comprising the unique video hash, a timestamp, watermark validation data, and encryption verification data; providing, by a verification application, access to the authentication metadata record via an application programming interface, wherein the application programming interface enables a third-party computing device to verify the authenticity of the video file by comparing a cryptographic hash of an input video file to the unique video hash stored in the blockchain ledger; validating, by a browser plugin executing on a user device, a video file encountered in a web browser by transmitting a request to the application programming interface, receiving an authentication status, and generating a visual alert if the video file fails verification; scanning, by a tamper detection module of the computing device, a stored copy of the video file at predetermined time intervals to detect unauthorized modifications by comparing a newly generated cryptographic hash of the stored copy to the unique video hash stored in the blockchain ledger; generating, by a fingerprinting module of the computing device, a cryptographic video fingerprint for the video file based on perceptual hashing techniques, the cryptographic video fingerprint allowing identification of modified versions of the video file even when an edit or compression is below a significance threshold have been applied; tracking, by a content traceability module of the computing device, the distribution and modification history of the video file by recording access events, modification attempts, and verification status in the blockchain ledger; embedding, by an active watermarking module of the computing device, an active watermark into the video file, wherein the active watermark transmits a callback signal to a verification server when the video file is accessed or played on a user device, enabling real-time tracking of video usage; verifying, by the verification application executing on a mobile device, the authenticity of the video file in real time by capturing the video file, generating a cryptographic hash of the captured video file, and comparing the cryptographic hash to the unique video hash stored in the blockchain ledger; and issuing, by a fraud detection module of the computing device, an automatic fraud alert to a registered content owner or platform administrator if the anomaly detection module identifies inconsistencies in the video file or if the video file fails verification against the blockchain ledger.

2. The method of claim 1, wherein the rotating digital watermark embedded by the watermarking module comprises a multi-layered pattern that changes at predefined intervals based on a cryptographic key, wherein the cryptographic key is stored in the blockchain ledger and updated dynamically to enhance security against removal or manipulation.

3. The method of claim 2, wherein the encryption module applies a hybrid encryption technique comprising a combination of symmetric and asymmetric quantum-resistant encryption algorithms to protect the rotating digital watermark and the authentication metadata record stored in the blockchain ledger.

4. The method of claim 3, wherein the anomaly detection module utilizes a convolutional neural network and a recurrent neural network to analyze temporal and spatial inconsistencies in the plurality of frames of the video file, wherein the convolutional neural network detects frame-level visual artifacts and the recurrent neural network analyzes sequential inconsistencies in motion patterns.

5. The method of claim 4, wherein the verification application provides access to the authentication metadata record using a zero-knowledge proof mechanism, enabling third-party computing devices to verify authenticity without exposing the original video file or its cryptographic hash.

6. The method of claim 5, wherein the browser plugin executing on the user device further modifies the visual alert based on the level of detected tampering, wherein an anomaly below a significance threshold triggers a yellow warning indicator and a significant manipulation triggers a red fraud alert with an automated content takedown request.

7. The method of claim 6, wherein the tamper detection module utilizes a decentralized consensus mechanism among multiple blockchain nodes to validate any modifications detected in a stored copy of the video file, ensuring that tamper detection cannot be altered or overridden by a single entity.

8. The method of claim 7, wherein the fingerprinting module applies perceptual hashing using deep hashing neural networks that generate feature-based cryptographic video fingerprints, allowing identification of visually similar video files despite format conversion, compression, or miner modifications below a significance threshold.

9. The method of claim 8, wherein the content traceability module further records and stores geolocation metadata associated with each access event, providing an additional layer of verification by ensuring that the video file has not been accessed or modified from unauthorized locations.

10. The method of claim 9, wherein the active watermarking module embeds a self-destructing watermark that deactivates if the video file is played on an unverified device, wherein the self-destructing watermark triggers an authentication failure and logs the unauthorized playback attempt in the blockchain ledger.

11. A method for authenticating digital video content using a blockchain-based system, the method comprising: receiving, by a computing device, a video file to be authenticated; generating, by a hashing module of the computing device, a cryptographic hash of the video file to produce a unique video hash; storing, by a blockchain node, the unique video hash on a blockchain ledger as an immutable authentication record by appending the unique video hash to a new block and linking the new block to a previously stored block in the blockchain ledger; embedding, by a watermarking module of the computing device, a rotating digital watermark into a plurality of frames of the video file, wherein the rotating digital watermark dynamically changes over time within the video file to prevent removal or forgery; generating, by the watermarking module, a multi-layered pattern within the rotating digital watermark, wherein the multi-layered pattern changes at predefined intervals based on a cryptographic key, and wherein the cryptographic key is stored in the blockchain ledger and updated dynamically to enhance security against removal or manipulation; applying, by an encryption module of the computing device, a hybrid encryption technique comprising a combination of symmetric and asymmetric quantum-resistant encryption algorithms to encrypt the rotating digital watermark and the authentication metadata record stored in the blockchain ledger; analyzing, by an anomaly detection module of the computing device, the plurality of frames of the video file using a convolutional neural network and a recurrent neural network to detect temporal and spatial inconsistencies, wherein the convolutional neural network detects frame-level visual artifacts and the recurrent neural network analyzes sequential inconsistencies in motion patterns; storing, by the blockchain node, an authentication metadata record associated with the video file on the blockchain ledger, the authentication metadata record comprising the unique video hash, a timestamp, watermark validation data, and encryption verification data; providing, by a verification application, access to the authentication metadata record using a zero-knowledge proof mechanism, wherein the zero-knowledge proof mechanism enables a third-party computing device to verify the authenticity of the video file without exposing the original video file or its cryptographic hash; validating, by a browser plugin executing on a user device, a video file encountered in a web browser by transmitting a request to the verification application, receiving an authentication status, and generating a visual alert, wherein an anomaly below a significance threshold detected in the video file triggers a yellow warning indicator and a significant manipulation detected in the video file triggers a red fraud alert with an automated content takedown request; scanning, by a tamper detection module of the computing device, a stored copy of the video file at predetermined time intervals to detect unauthorized modifications by comparing a newly generated cryptographic hash of the stored copy to the unique video hash stored in the blockchain ledger; validating, by the tamper detection module, any detected modifications using a decentralized consensus mechanism among multiple blockchain nodes to ensure that tamper detection cannot be altered or overridden by a single entity; generating, by a fingerprinting module of the computing device, a cryptographic video fingerprint for the video file based on perceptual hashing techniques, wherein the cryptographic video fingerprint allows identification of modified versions of the video file even when an edit or compression is below a significance threshold have been applied; applying, by the fingerprinting module, deep hashing neural networks to generate feature-based cryptographic video fingerprints, allowing identification of visually similar video files despite format conversion, compression, or modifications below a significance threshold; tracking, by a content traceability module of the computing device, the distribution and modification history of the video file by recording access events, modification attempts, and verification status in the blockchain ledger; recording, by the content traceability module, geolocation metadata associated with each access event, wherein the geolocation metadata provides an additional layer of verification by ensuring that the video file has not been accessed or modified from unauthorized locations; embedding, by an active watermarking module of the computing device, an active watermark into the video file, wherein the active watermark transmits a callback signal to a verification server when the video file is accessed or played on a user device, enabling real-time tracking of video usage; embedding, by the active watermarking module, a self-destructing watermark into the video file, wherein the self-destructing watermark deactivates if the video file is played on an unverified device, and wherein the self-destructing watermark triggers an authentication failure and logs the unauthorized playback attempt in the blockchain ledger; verifying, by the verification application executing on a mobile device, the authenticity of the video file in real time by capturing the video file, generating a cryptographic hash of the captured video file, and comparing the cryptographic hash to the unique video hash stored in the blockchain ledger; and issuing, by a fraud detection module of the computing device, an automatic fraud alert to a registered content owner or platform administrator if the anomaly detection module identifies inconsistencies in the video file or if the video file fails verification against the blockchain ledger.

12. A system for authenticating digital video content using a blockchain-based authentication platform, the system comprising: a computing device configured to receive a video file to be authenticated; a hashing module of the computing device configured to generate a cryptographic hash of the video file to produce a unique video hash; a blockchain node configured to store the unique video hash on a blockchain ledger as an immutable authentication record by appending the unique video hash to a new block and linking the new block to a previously stored block in the blockchain ledger; a watermarking module of the computing device configured to embed a rotating digital watermark into a plurality of frames of the video file, wherein the rotating digital watermark dynamically changes over time within the video file to prevent removal or forgery; a cryptographic key storage in the blockchain ledger configured to store a cryptographic key associated with the rotating digital watermark, wherein the cryptographic key updates dynamically to enhance security against removal or manipulation; an encryption module of the computing device configured to apply a hybrid encryption technique comprising a combination of symmetric and asymmetric quantum-resistant encryption algorithms to encrypt the rotating digital watermark and the authentication metadata record stored in the blockchain ledger; an anomaly detection module of the computing device configured to analyze the plurality of frames of the video file using a convolutional neural network and a recurrent neural network to detect temporal and spatial inconsistencies, wherein the convolutional neural network detects frame-level visual artifacts and the recurrent neural network analyzes sequential inconsistencies in motion patterns; blockchain metadata storage configured to store an authentication metadata record associated with the video file on the blockchain ledger, wherein the authentication metadata record comprises the unique video hash, a timestamp, watermark validation data, and encryption verification data; a verification application configured to provide access to the authentication metadata record using a zero-knowledge proof mechanism, wherein the zero-knowledge proof mechanism enables a third-party computing device to verify the authenticity of the video file without exposing the original video file or its cryptographic hash; a browser plugin executing on a user device and configured to validate a video file encountered in a web browser by transmitting a request to the verification application, receiving an authentication status, and generating a visual alert, wherein an anomaly below a significance threshold detected in the video file triggers a yellow warning indicator and a significant manipulation detected in the video file triggers a red fraud alert with an automated content takedown request; a tamper detection module of the computing device configured to scan a stored copy of the video file at predetermined time intervals to detect unauthorized modifications by comparing a newly generated cryptographic hash of the stored copy to the unique video hash stored in the blockchain ledger; a decentralized consensus validation mechanism among multiple blockchain nodes configured to validate any detected modifications in the stored copy of the video file, wherein the decentralized consensus mechanism ensures that tamper detection cannot be altered or overridden by a single entity; a fingerprinting module of the computing device configured to generate a cryptographic video fingerprint for the video file based on perceptual hashing techniques, wherein the cryptographic video fingerprint allows identification of modified versions of the video file even when an edit or compression is below a significance threshold have been applied; a deep hashing neural network in the fingerprinting module configured to generate feature-based cryptographic video fingerprints, wherein the feature-based cryptographic video fingerprints enable identification of visually similar video files despite format conversion, compression, or modifications below a significance threshold; a content traceability module of the computing device configured to track the distribution and modification history of the video file by recording access events, modification attempts, and verification status in the blockchain ledger; a geolocation metadata storage in the content traceability module configured to record geolocation metadata associated with each access event, wherein the geolocation metadata provides an additional layer of verification by ensuring that the video file has not been accessed or modified from unauthorized locations; an active watermarking module of the computing device configured to embed an active watermark into the video file, wherein the active watermark transmits a callback signal to a verification server when the video file is accessed or played on a user device, enabling real-time tracking of video usage; a self-destructing watermark in the active watermarking module configured to deactivate if the video file is played on an unverified device, wherein the self-destructing watermark triggers an authentication failure and logs the unauthorized playback attempt in the blockchain ledger; a mobile verification application executing on a mobile device and configured to verify the authenticity of the video file in real time by capturing the video file, generating a cryptographic hash of the captured video file, and comparing the cryptographic hash to the unique video hash stored in the blockchain ledger; and a fraud detection module of the computing device configured to issue an automatic fraud alert to a registered content owner or platform administrator if the anomaly detection module identifies inconsistencies in the video file or if the video file fails verification against the blockchain ledger.

13. The system of claim 12, wherein the blockchain node is further configured to implement a multi-chain interoperability protocol, allowing the blockchain ledger to synchronize authentication metadata records across multiple blockchain networks to enhance redundancy and prevent data loss.

14. The system of claim 13, wherein the blockchain metadata storage further comprises a hierarchical data structure that categorizes authentication metadata records based on predefined classification parameters, including video content type, authentication timestamp, content ownership, and security level.

15. The system of claim 14, wherein the watermarking module is further configured to generate a perceptual-based adaptive watermarking pattern, wherein the perceptual-based adaptive watermarking pattern varies the opacity and placement of the rotating digital watermark based on video scene complexity to minimize visual disruption while maximizing security.

16. The system of claim 15, wherein the anomaly detection module further comprises a generative adversarial network trained to generate synthetic video forgeries and compare the generated synthetic video forgeries against the plurality of frames of the video file to detect subtle inconsistencies indicative of manipulation.

17. The system of claim 16, wherein the verification application further comprises a reputation-based verification scoring system, wherein the reputation-based verification scoring system assigns a weighted trust score to the video file based on historical authentication events, blockchain consensus validation, and third-party verification attempts.

18. The system of claim 17, wherein the browser plugin further comprises a machine learning-based risk assessment engine configured to analyze historical user interactions with unverified video content, wherein the machine learning-based risk assessment engine adjusts alert sensitivity based on detected viewing patterns and user authentication preferences.

19. The system of claim 18, wherein the mobile verification application further comprises an augmented reality overlay interface, wherein the augmented reality overlay interface visually annotates verified video content in real time by displaying blockchain authentication metadata as an interactive overlay on the video file when viewed through a mobile device camera.

20. The system of claim 19, wherein the fraud detection module further comprises a predictive threat analysis engine, wherein the predictive threat analysis engine utilizes historical fraud patterns, deep learning anomaly detection, and blockchain access logs to identify emerging trends in video manipulation techniques and preemptively flag high-risk content before it is widely distributed.

* * * * *